United States Patent
Iacono et al.

(10) Patent No.: US 11,205,212 B1
(45) Date of Patent: Dec. 21, 2021

(54) INTEGRATION OF FUNCTIONALITY OF A FULFILLMENT SERVICE PROVIDER INTO THIRD-PARTY APPLICATION

(71) Applicant: DoorDash, Inc., San Francisco, CA (US)

(72) Inventors: Jeffrey F. Iacono, San Francisco, CA (US); Keith Chu, Oakland, CA (US); Joey Lu, San Francisco, CA (US); Michael Thole, Portland, OR (US); Sang Zhang, San Francisco, CA (US)

(73) Assignee: DoorDash, Inc., San Francisco, CA (US)

(*) Notice: Subject to any disclaimer, the term of this patent is extended or adjusted under 35 U.S.C. 154(b) by 169 days.

(21) Appl. No.: 16/406,884

(22) Filed: May 8, 2019

(51) Int. Cl.
*G06Q 30/00* (2012.01)
*G06Q 30/06* (2012.01)

(52) U.S. Cl.
CPC ..... *G06Q 30/0631* (2013.01); *G06Q 30/0641* (2013.01)

(58) Field of Classification Search
CPC ........... G06Q 30/0631; G06Q 30/0641; G06N 20/00; G06F 21/44
See application file for complete search history.

(56) References Cited

U.S. PATENT DOCUMENTS

| | | | |
|---|---|---|---|
| 6,026,375 A | 2/2000 | Hall et al. | |
| 6,324,476 B1 | 11/2001 | Trovato | |
| 9,269,103 B1 | 2/2016 | Kumar et al. | |
| 9,639,908 B1 | 5/2017 | Reiss et al. | |
| 9,679,489 B2 | 6/2017 | Lambert et al. | |
| 9,754,331 B1 | 9/2017 | Beckelman et al. | |
| 9,811,838 B1 | 11/2017 | Daire et al. | |

(Continued)

FOREIGN PATENT DOCUMENTS

WO 2011/140130 A2 11/2011

OTHER PUBLICATIONS

Macedo, Augusto Q., Leandro B. Marinho, and Rodrygo LT Santos. "Context-aware event recommendation in event-based social networks." Proceedings of the 9th ACM Conference on Recommender Systems. (Year: 2015).*

(Continued)

*Primary Examiner* — Matthew E Zimmerman
(74) *Attorney, Agent, or Firm* — Kwan & Olynick LLP

(57) ABSTRACT

Integrating a fulfillment service provider into a third-party application via an Application Programming Interface (API) is described. In an example, a computing device associated with a fulfillment service provider can determine, based at least in part on an indication of an interaction between a user and a third-party application, that the fulfillment service provider has been initialized. In one example, functionality associated with the fulfillment service provider can be accessible to the third-party application via an API. In at least one example, the computing device can generate, based at least in part on the interaction with the third-party application and while the fulfillment service provider is initialized, a recommendation of at least one of a service, a merchant, or an item associated with the fulfillment service provider. The computing device can cause the recommendation to be presented via at least one of the third-party application or the fulfillment service provider.

21 Claims, 12 Drawing Sheets

(56) References Cited

U.S. PATENT DOCUMENTS

| | | |
|---|---|---|
| 9,846,086 B1 | 12/2017 | Robinson et al. |
| 9,858,614 B2 | 1/2018 | Seaward et al. |
| 10,133,995 B1 | 11/2018 | Reiss et al. |
| 10,181,111 B1 | 1/2019 | Kohli et al. |
| 10,346,889 B1 | 7/2019 | Reiss et al. |
| 2002/0138350 A1 | 9/2002 | Cogen |
| 2002/0143655 A1 | 10/2002 | Elston et al. |
| 2002/0178074 A1 | 11/2002 | Bloom |
| 2003/0125963 A1 | 7/2003 | Haken |
| 2005/0058755 A1 | 3/2005 | Chambers |
| 2005/0236478 A1 | 10/2005 | St. Clair et al. |
| 2006/0121161 A1 | 6/2006 | Garrett |
| 2006/0136237 A1 | 6/2006 | Spiegel et al. |
| 2006/0235754 A1 | 10/2006 | Walker et al. |
| 2006/0293971 A1 | 12/2006 | Hunter et al. |
| 2007/0168118 A1 | 7/2007 | Lappe et al. |
| 2007/0185776 A1 | 8/2007 | Nguyen et al. |
| 2007/0192111 A1 | 8/2007 | Chasen |
| 2008/0275643 A1 | 11/2008 | Yaqub et al. |
| 2009/0106124 A1 | 4/2009 | Yang |
| 2009/0187488 A1 | 7/2009 | Shamilian |
| 2009/0254445 A1 | 10/2009 | Bennett et al. |
| 2009/0281903 A1 | 11/2009 | Blatstein |
| 2009/0307096 A1 | 12/2009 | Antonellis |
| 2010/0076853 A1 | 3/2010 | Schwarz |
| 2010/0114790 A1 | 5/2010 | Strimling et al. |
| 2011/0055046 A1 | 3/2011 | Bowen et al. |
| 2012/0173308 A1 | 7/2012 | Brown et al. |
| 2012/0272268 A1* | 10/2012 | McCarthy, III .. H04N 21/44008 725/39 |
| 2012/0303425 A1 | 11/2012 | Katzin et al. |
| 2013/0080204 A1 | 3/2013 | Khorashadi et al. |
| 2013/0110396 A1 | 5/2013 | Choudhury |
| 2013/0151357 A1 | 6/2013 | Havas et al. |
| 2013/0151417 A1* | 6/2013 | Gupta ................... G06Q 20/382 705/65 |
| 2013/0218727 A1 | 8/2013 | Lutnick et al. |
| 2013/0226651 A1 | 8/2013 | Napper |
| 2014/0074743 A1 | 3/2014 | Rademaker |
| 2014/0095311 A1 | 4/2014 | Bulloch, Jr. |
| 2014/0108333 A1* | 4/2014 | Jain .......................... H04L 67/22 707/609 |
| 2014/0164126 A1 | 6/2014 | Nicholas et al. |
| 2014/0180953 A1 | 6/2014 | Westcott et al. |
| 2014/0180959 A1 | 6/2014 | Gillen et al. |
| 2014/0188637 A1 | 7/2014 | Balasubramaniam et al. |
| 2014/0214465 A1 | 7/2014 | L'Heureux et al. |
| 2014/0222519 A1 | 8/2014 | Swinson et al. |
| 2014/0278676 A1* | 9/2014 | Burka ................ G06Q 10/1093 705/7.19 |
| 2014/0279081 A1 | 9/2014 | Marx et al. |
| 2014/0279667 A1 | 9/2014 | Gillen |
| 2014/0286150 A1 | 9/2014 | Miura |
| 2014/0297470 A1 | 10/2014 | Ramadge et al. |
| 2014/0310196 A1 | 10/2014 | Yamamura |
| 2014/0343841 A1 | 11/2014 | Faaborg et al. |
| 2014/0370167 A1 | 12/2014 | Garden |
| 2015/0095122 A1 | 4/2015 | Eramian |
| 2015/0112774 A1 | 4/2015 | Georgoff et al. |
| 2015/0178778 A1 | 6/2015 | Lee et al. |
| 2015/0206093 A1 | 7/2015 | Trew et al. |
| 2015/0227888 A1 | 8/2015 | Levanon et al. |
| 2015/0227890 A1 | 8/2015 | Bednarek et al. |
| 2015/0269521 A1 | 9/2015 | Knapp et al. |
| 2015/0286984 A1 | 10/2015 | Dikman et al. |
| 2015/0294265 A1 | 10/2015 | Monteverde |
| 2015/0324717 A1 | 11/2015 | Lord et al. |
| 2015/0324729 A1 | 11/2015 | Lord et al. |
| 2015/0332215 A1 | 11/2015 | Wilson et al. |
| 2015/0371317 A1 | 12/2015 | Bosko et al. |
| 2016/0019496 A1 | 1/2016 | Gorlin |
| 2016/0048804 A1 | 2/2016 | Paul et al. |
| 2016/0063438 A1 | 3/2016 | Shuken et al. |
| 2016/0071050 A1 | 3/2016 | Kaye |
| 2016/0171591 A1 | 6/2016 | Williams et al. |
| 2016/0196525 A1 | 7/2016 | Kantor et al. |
| 2016/0196528 A1 | 7/2016 | Lemmon |
| 2016/0292664 A1 | 10/2016 | Gilfoyle |
| 2017/0200218 A1 | 7/2017 | Napper |
| 2018/0022405 A1 | 1/2018 | Gecchelin et al. |
| 2018/0047242 A1 | 2/2018 | Lutnick et al. |
| 2019/0205942 A1* | 7/2019 | Gutnik ............... G06Q 30/0631 |

OTHER PUBLICATIONS

"GPS Comes To High-Tech Pizza-Delivery Tracking; One Papa John's chain lets customers track their deliveries street by street. Domino's, meanwhile, is making its own tracking technology push," CMP Media, Inc., pp. 1-2 (Feb. 1, 2008).

Non-Final Office Action dated Jun. 24, 2015, in U.S. Appl. No. 14/663,671, of Reiss, J L., et al., filed Mar. 20, 2015.

Final Office Action dated Dec. 24, 2015, in U.S. Appl. No. 14/663,671, of Reiss, J.L., et al., filed Mar. 20, 2015.

Advisory Action dated Mar. 9, 2016, in U.S. Appl. No. 14/663,671, of Reiss, J.L., et al., filed Mar. 20, 2015.

Non-Final Office Action dated Oct. 6, 2016, for U.S. Appl. No. 14/663,671, of Reiss, J.L., et al., filed Mar. 20, 2015.

Notice of Allowance dated Dec. 22, 2016, for U.S. Appl. No. 14/663,671, of Reiss, J.L., et al., filed Mar. 20, 2015.

Non-Final Office Action dated Nov. 9, 2017, for U.S. Appl. No. 14/625,673, of Reiss, J.L., et al., filed Feb. 19, 2015.

Non-Final Office Action dated Jan. 12, 2018, for U.S. Appl. No. 14/813,358, of Kohli, A., filed Jul. 30, 2015.

Non-Final Office Action dated Feb. 1, 2018, for U.S. Appl. No. 14/993,149, of Kohli, A., et al., filed Jan. 12, 2016.

Non-Final Office Action dated Mar. 8, 2018, for U.S. Appl. No. 14/663,678, of Reiss, J.L., et al., filed Mar. 20, 2015.

Non-Final Office Action dated Apr. 2, 2018, for U.S. Appl. No. 14/926,056, of Bernstein, B.R., et al., filed Oct. 29, 2015.

Notice of Allowance dated Jun. 25, 2018, for U.S. Appl. No. 14/625,673, of Reiss, J.L., et al., filed Feb. 19, 2015.

Non-Final Office Action dated Jul. 13, 2018, for U.S. Appl. No. 14/710,808, of Reiss, J.L., et al., filed Oct. 29, 2015.

Final Office Action dated Jul. 23, 2018, for U.S. Appl. No. 14/663,678, of Reiss, J.L., et al., filed Mar. 20, 2015.

Notice of Allowance dated Sep. 6, 2018, for U.S. Appl. No. 14/993,149, of Kohli, A., et al., filed Jan. 12, 2016.

Final Office Action dated Oct. 17, 2018, for U.S. Appl. No. 14/926,056, of Bernstein, B.R., et al., filed Oct. 29, 2015.

Final Office Action dated Nov. 16, 2018, for U.S. Appl. No. 14/813,358, of Kohli, A., filed Jul. 30, 2015.

Non Final Office Action dated Dec. 17, 2018, for U.S. Appl. No. 14/663,678, of Reiss, J.L., et al., filed Mar. 20, 2015.

Advisory Action dated Jan. 29, 2019, for U.S. Appl. No. 14/926,056, of Bernstein, B.R., et al., filed Oct. 29, 2015.

Notice of Allowance dated Feb. 25, 2019, for U.S. Appl. No. 14/710,808, of Reiss, J.L. et al., filed May 13, 2015.

EIC 3600 Search Report dated Feb. 25, 2019, for U.S. Appl. No. 14/710,808, of Reiss, J.L. et al., filed May 13, 2015.

Non Final Office Action dated Apr. 4, 2019, for U.S. Appl. No. 14/813,358, of Kohli, A., filed Jul. 30, 2015.

Notice of Allowance dated Jun. 12, 2019, for U.S. Appl. No. 14/663,678, of Reiss, J.L., et al., filed Mar. 20, 2015.

Non Final Office Action dated Jul. 30, 2019, for U.S. Appl. No. 15/496,040, of Reiss, J.L., et al., filed Apr. 25, 2017.

* cited by examiner

INTEGRATION OF FUNCTIONALITY OF A FULFILLMENT SERVICE PROVIDER INTO THIRD-PARTY APPLICATION

BACKGROUND

Service providers can be limited to providing their respective services to their respective customers. As a result, service providers limit their ability to expand their customer base and/or foreclose their customers from receiving holistic, fulfilling customer experiences available via other service providers, often in other verticals of service.

BRIEF DESCRIPTION OF THE DRAWINGS

Features of the present disclosure, its nature and various advantages, will be more apparent upon consideration of the following detailed description, taken in conjunction with the accompanying drawings.

In the figures, the left-most digit(s) of a reference number identifies the figure in which the reference number first appears. The use of the same reference numbers in different figures indicates similar or identical items or features. The drawings are not to scale.

DETAILED DESCRIPTION

Figure 1:
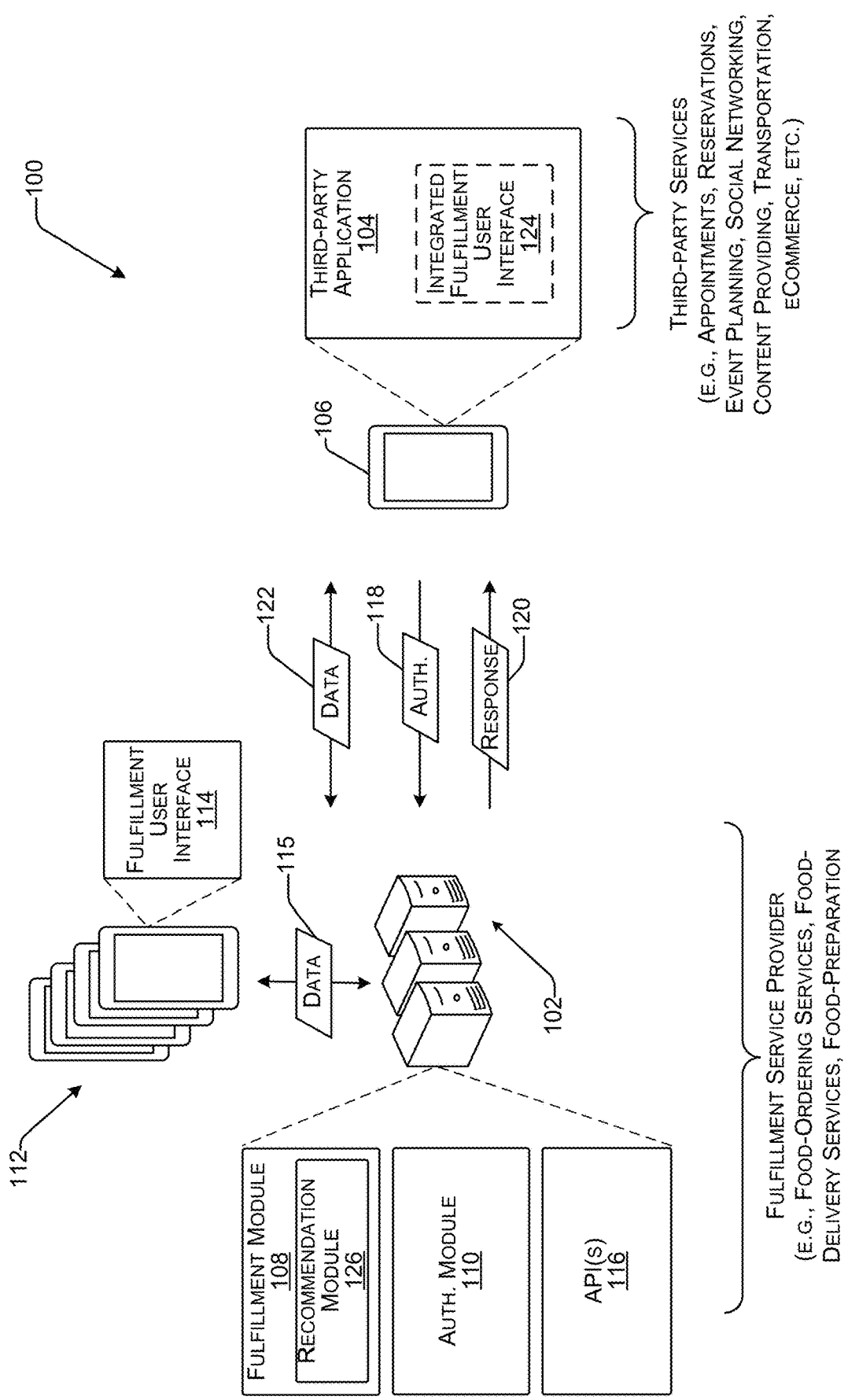
FIG. 1 illustrates an example environment for, among other things, enabling third-party applications to access functionality of a fulfillment service provider via, for instance, an Application Programming Interface (API), as described herein.

Techniques described herein are directed to the integration of functionality of a fulfillment service provider into a third-party application, for instance, via an Application Programming Interface (API). In an example, third-party developers can integrate functionality of a fulfillment service provider into their own software or web services via an API provided by the fulfillment service provider. The fulfillment service provider can provide food-preparation services, food-ordering services, food-delivery services, and so on. The fulfillment service provider can also provide retail services, order services, inventory services, shipping services, and the like, as described below. Techniques described herein enable a user of a third-party developer's software or web services to access functionality and/or services of the fulfillment service provider without needing to leave the third-party developer's software or web services. That is, the user can access food-preparation services, food-ordering services, food-delivery services, and so on via the third-party developer's software or web services without leaving the third-party developer's software or web services.

Techniques described herein enable third-party developers to integrate functionality of a fulfillment service provider into their own software or web services, for instance, via an API provided by the fulfillment service provider. In an example, and as described below, techniques described herein can determine whether the fulfillment service provider has been initialized while a user interacts with a third-party application. Such a determination can be made based at least in part on an explicit or implicit indication of an interaction between the user and the third-party application. Alternatively or additionally, techniques described herein can determine initialization based on context of the interaction between the user and the third-party application, e.g., using natural language processing (NLP). Responsive to determining that the fulfillment service provider has been initialized, the fulfillment service provider can generate a recommendation of a service, a merchant, and/or an item associated with the fulfillment service provider. The recommendation can be presented via the third-party application and/or the fulfillment service provider. In some examples, the user can access the fulfillment service provider without creating an account with the fulfillment service provider, or by using the credentials of the third-party application. That is, the methods and systems allow creation of timed or limited-use communication channels to enable such frictionless interaction with the fulfillment service provider. This is helpful, for example, when the user does not wish to create separate accounts or share their personally identifying information (PII) with the fulfillment service provider.

In at least one example, a user can utilize a third-party application to plan an event (e.g., an event-planning application). The user can enter event details, including but not limited to, a date, a time, a location, a budget, a theme, an invitee list, etc., into the third-party application. In some examples, the invitee list can comprise contact information for sending electronic invites and receiving electronic RSVPs, which can generate a real-time count of invitees planning to attend the event and an indication of which invitees are planning to attend the event. Using techniques described herein, a developer associated with the event-planning application can integrate functionality and/or services of the fulfillment service provider into the event-planning application. As such, in at least one example, the fulfillment service provider can recommend food-preparation services, food-ordering services, food-delivery services, and so on via the event-planning application. For instance, the fulfillment service provider can utilize the event details to recommend restaurants for providing food for the event, a menu for the event, a quantity of food to be ordered for the event, and the like. In some examples, such recommendations can be updated in near-real-time, for instance, as the invitee list is updated via electronic RSVPs.

In another example, a user can utilize a third-party application to request a ride (e.g., via a transportation application). The user can provide a pick-up location and a drop-off location. A driver using the transportation application (or, alternatively an autonomous vehicle) can pick up the user at the pick-up location and drive the user to the drop-off location, along a route. Using techniques described herein, a developer associated with the transportation application can integrate functionality and/or services of the fulfillment service provider into the transportation application. As such, in at least one example, the fulfillment service provider can recommend food-preparation services, food-ordering services, food-delivery services, and so on via the transportation application. For instance, the fulfillment service provider can recommend that the user place an order for delivery at a particular time so that the order is delivered at (or near) the same time that the user is dropped off at the drop-off location. Or, the fulfillment service provider can identify restaurants along the route that provide orders for pick-up. As such, the fulfillment service provider can recommend such restaurants to the user and the user can opt to place a pick-up order while on the ride. The transportation application can notify the driver of the additional stop to enable the user to pick up the order, while on the route. The fulfillment service provider tracks the interaction between the user and the transportation application, e.g., through an API, to synchronize events, such as ordering, delivery, and the like, with how far the user is from their destination. For example, the events initialized by the fulfillment service provider are tied to state, e.g., tracked via a state machine, of the events initialized by the transportation application.

Additional or alternative examples of integrating services and/or functionality of the fulfillment service provider into other third-party applications are described below.

As will be described below, techniques described herein can be implemented via a communication network that enables third-party applications to communicate with server(s) that are associated with a fulfillment service provider. Techniques described herein thus utilize the technical capability of such a communication network to enable the integration of services and/or functionalities that are available via different service providers into a single access point. That is, as described herein, techniques utilize API(s) to enable third-party applications to integrate services and/or functionalities of a fulfillment service provider. For instance, individual third-party service providers can utilize API(s) and/or a software developer kit (SDK) provided by the fulfillment service provider to allow third-party developers to include fulfillment service provider functionality and/or avail fulfillment service provider services in association with their own third-party applications. That is, the API(s) and/or SDK can enable third-party developers to customize how their respective third-party applications interact with the fulfillment service provider. The third-party applications can exchange data with the server(s) that host the fulfillment service provider, using the technical capabilities of communication networks, to provide such functionality and/or services. In many examples, as described below, the use of fulfillment service provider functionality and/or services can be dynamic and individualized for each of the third-party applications, thereby providing more efficient use of functionalities and/or services available via the fulfillment service provider. As such, techniques described herein are directed to improved performance of computing systems.

As described above, techniques described herein enable third-party developers to integrate functionality of a fulfillment service provider into their own software or web services, for instance, via an API provided by the fulfillment service provider. In an example, and as described below, techniques described herein can determine whether the fulfillment service provider has been initialized while a user is interacting with a third-party application. Such a determination can be made based at least in part on an indication of an interaction between the user and the third-party application. Responsive to detecting that the fulfillment service provider has been initialized, the fulfillment service provider can generate a recommendation of a service, a merchant, and/or an item associated with the fulfillment service provider. The recommendation can be presented via the third-party application and/or the fulfillment service provider. In some examples, such a recommendation can be automatically routed to a user (e.g., a device associated therewith) based on behavioral patterns of the user (and/or other users) of the fulfillment service provider. Additional details are described below.

Current technology requires users to transition between applications to access different services, and in some cases where the uses do not have accounts with these services, users have to first generate accounts with those services. For instance, if a user is watching a video via a content providing application and wants to order a pizza, the user is required to exit the content providing application, determine a service that would deliver the pizza, and then open another application for ordering the pizza. Such a transition causes friction for users and, additionally, consumes computational resources, as described below. That is, existing capabilities of computing devices are inefficient. Techniques described herein provide a specific improvement in the capabilities of computing devices. For instance, instead of requiring a user to open two separate applications to access two different services, such is the case with existing capabilities of computing devices, techniques described herein are directed to the integration of services and/or functionalities via API(s). Accordingly, the user need not toggle between the third-party application and an application associated with the fulfillment service provider, for example, to access services and/or functionalities provided by the different service providers.

That is, techniques described herein improve the efficiency of using computing devices by bringing together functionalities of multiple service providers via a common access point, using, for example, API(s). For instance, integrating services and/or functionalities via a single access point enables users to access services and/or functionalities without closing a current application, opening up another application, interacting with the other application, and so on. Thus, techniques described herein reduce friction caused by existing capabilities of computing devices and reduce computational resources required for availing services and/or functionalities from multiple service providers to users. As such, techniques described herein can offer an improvement in the functioning of computing devices.

Additional or alternative technical improvements are described below with reference to FIGS. 1-15.

FIG. 1 illustrates an example environment 100 for, among other things, enabling third-party applications to access functionality of a fulfillment service provider via, for instance, an Application Programming Interface (API), as described herein. The example environment 100 includes server computing device(s) (server(s) 102), which can communicate with a third-party application 104, an instance of which can be installed on a computing device (e.g., user device 106). Additional details associated with the server(s) 102 and the user device 106 are described below. In at least one example, the server(s) 102 can be associated with a fulfillment service provider, which can provide one or more fulfillment services. For instance, the server(s) 102 can be associated with one or more functional components, including, but not limited to, a fulfillment module 108, which can be configured to facilitate food-ordering services, food-delivery services, food-preparation services, combinations of the foregoing, and the like. In at least one example, the server(s) 102 can include an additional functional component, such as an authentication module 110 (e.g., auth. module 110 in FIG. 1), which can be configured to authenticate third-party applications requesting to access fulfillment services availed via the fulfillment service provider. Additional details associated with the authentication module 110 are described below.

In at least one example, the fulfillment service provider can be associated with a plurality of devices 112 used by partners and/or patrons of the fulfillment service provider. Partners can include merchants or other entities providing, among other services, food-ordering services, food-delivery services, food-preparation services, combinations of the foregoing, and the like. Patrons can include users or other entities using food-ordering services, food-delivery services, food-preparation services, combinations of the foregoing, and the like. Further, patrons can include users or other entities that use any other service available via the fulfillment service provider (e.g., retail services, shipping services, inventory services, lending services, etc., as described below). Each of the devices 112 can have a fulfillment user interface 114 through which the partners and/or patrons can interact with the devices 112 and the server(s) 102 (e.g., via the exchange of data 115). The fulfillment user interface 114 can be presented via a web browser, an application (e.g., desktop or otherwise dedicated, provided by the fulfillment service provider, etc.), or the like to enable the partners to provide fulfillment services.

In at least one example, the fulfillment module 108 can receive orders for fulfillment via the fulfillment user interface 114. For example, a patron can order one or more food items for pick up or delivery via the fulfillment user interface 114. Additionally or alternatively, the fulfillment module 108 can generate recommendations for fulfillment services to recommend to patrons. For example, the fulfillment module 108 can utilize user information associated with a patron and/or context information associated with interactions between a patron and the fulfillment user interface 114 to recommend service(s), merchant(s), and/or item(s) (associated with the fulfillment service provider) to the patron. For instance, the fulfillment module 108 can recommend a food-delivery service for delivering food to the patron, a set of restaurants having a particular cuisine that is within a threshold distance of the patron, a particular item to order based on previous order history, and so on. In some examples, such recommendations can be generated using a machine-trained model, which can be trained on training data associated with the patron (individually), a cohort of patrons (e.g., a group of patrons sharing one or more characteristics and/or having a similarity metric that satisfies a threshold), a general population of patrons that use the fulfillment service provider, and so on. The fulfillment module 108 can present recommendations to patrons via the fulfillment user interface 114 (e.g., via push notifications, interstitials, deep links, text messages, or the like). The recommendation can be interactive to allow the user to engage with the recommendation while in the third-party application.

Furthermore, the fulfillment module 108 can transmit instructions to partners of the fulfillment service provider. In such an example, the fulfillment module 108 can receive orders (e.g., from patrons) and can transmit orders for preparation, instructions for delivery, and so on to the partners. Such orders can be presented via the fulfillment user interface 114. In some examples, the fulfillment module 108 can track timing of order preparation and/or delivery schedules to batch order preparation and/or delivery. That is, in some examples, the fulfillment module 108 can receive data indicative of actions of the partners of the fulfillment service provider (e.g., via interactions with the fulfillment user interface 114) and can determine when to batch multiple deliveries into a single delivery for a courier (e.g., delivering food) or batch multiple orders of a food item into a single preparation by a cook.

In at least one example, the user device 106 can have an instance of a third-party application 104 stored on the user device 106. In at least one example, the third-party application 104 can be a desktop application or other dedicated application, a web-based application, or the like. In at least one example, the third-party application 104 can present a user interface to enable a user to access functionality and/or services of a third-party service provider. As described herein, the third-party application 104 can be associated with a third-party service provider that provides one or more services. Examples of such services include, but are not limited to, appointments, reservations, event planning, social networking, content providing, transportation, eCommerce, peer-to-peer payments, etc. While FIG. 1 includes a single third-party application 104, the example environment 100 can additionally include a plurality of third-party applications. In some examples, the user device 106 can have instances of multiple third-party applications installed thereon. That is, in such examples, the user device 106 can have access to multiple third-party services respectively corresponding to the third-party applications. Furthermore, in at least one example, the user device 106 can have an instance of an application associated with the fulfillment service provider and/or a web browser that enables the user device 106 to present the fulfillment user interface 114. That is, in some examples, the user of the user device 106 can be a patron of the fulfillment service provider.

The third-party application 104 and third-party service provider are "third-party" in that they utilize different server computing device(s) for providing their service(s) and not the server(s) 102 associated with the fulfillment service provider. Furthermore, in at least one example, the third-party application 104 can be developed by an entity that is different than, and separate from, the fulfillment service provider.

In at least one example, the fulfillment service provider (e.g., the server(s) 102 associated therewith) can expose fulfillment service provider functionality and/or services via one or more APIs 116. The API(s) 116, which can be associated with the server(s) 102, can expose fulfillment service provider functionality and/or avail fulfillment service provider services to an application associated with the fulfillment user interface 114 and/or the third-party application 104. At least one of the API(s) 116 can be a private API, thereby availing services and/or functionalities to functional components (e.g., applications, etc.) that are developed internally (e.g., by developers associated with the fulfillment service provider). At least one of the API(s) 116 can be an open or public API, which is a publicly available API that provides third-party developers with programmatic access to a proprietary software application or web service (e.g., such as the fulfillment service provider described herein). The API(s) 116 can include sets of requirements that govern how applications, or other functional components, can interact with one another.

In some examples, the fulfillment service provider can provide the third-party entity with a software developer kit ("SDK") that may utilize functionality exposed by the API(s) 116. The SDK can include software development tools that allow a third-party developer (i.e., a developer that is separate from the fulfillment service provider) to include fulfillment service provider functionality and/or avail fulfillment service provider services. The SDK and/or the API(s) 116 may include one or more libraries, programming code, executables, other utilities, and documentation that allows the developer to directly include fulfillment service provider functionality and/or avail fulfillment service provider services within an application, such as the third-party application 104.

In at least one example, the third-party application 104 can send an authentication request 118 to the server(s) 102. The authentication request 118 can include an identifier to identify the third-party service provider submitting the authentication request 118. In some examples, the authentication request 118 can be associated with a token (e.g., a piece of data that is meaningless unless combined with a correct tokenization system), which can verify the authenticity of the authentication request 118. The authentication module 110 can evaluate the authentication request 118, to determine whether the associated third-party service provider is, among other things, a developer in good standing. If the third-party service provider is a developer in good standing, the authentication module 110 can send a response 120 indicating access to the fulfillment service provider has been granted. In some cases, the level of access is varied based on the response 120, where the level of access determines access to all or a portion of functionalities offered by the fulfillment service provider. In such an example, the authentication module 110 can associate the third-party application with the fulfillment service provider, for instance by adding an indicator to a profile of the third-party service provider indicating that the third-party application 104 is authenticated, and optionally, another indicator that shows the level of access. However, if the third-party service provider is not in good standing, the authentication module 110 can send a response 120 indicating that access to the fulfillment service provider is denied.

Based at least in part on authenticating the third-party application 104, the server(s) 102 can exchange data 122 with the third-party application 104, via the API(s) 116, thereby integrating services of the fulfillment service provider with the third-party services. In some implementations, the data includes user information such that the same information can be used to access the fulfilment service provider without a separate account creation process. As such, a user of the user device 106 can access services of the fulfillment service provider (e.g., via an integrated fulfillment user interface 124) while interacting with the third-party application 104, without needing to exit the third-party application 104 to access such services. That is, the example environment 100 enables integration of the fulfillment service provider into the third-party application 104 via, for instance, API(s) 116 (and/or the SDK). In at least one example, at least some of the structure and/or function available via the fulfillment user interface 114 can be integrated into the third-party application 104 via the integrated fulfillment user interface 124.

After the fulfillment service provider is integrated into the third-party application 104, as described above, the fulfillment service provider can generate recommendations for fulfillment services, which can be presented to user(s) of the third-party application 104, for example while the user is in the third-party application 104. In at least one example, the fulfillment service provider, via the fulfillment module 108, can be initialized (e.g., prepared to perform one more interactions) while a user is interacting with the third-party application 104. That is, in at least one example, the fulfillment module 108 can receive an indication that the user is interacting with the third-party application 104, via the API(s) 116 for instance, and the fulfillment module 108 can initialize such to avail functionality and/or services of the fulfillment service provider to the third-party application 104. In some examples, the fulfillment service provider can be initialized responsive to an input received from a user via the third-party application 104. In such examples, the fulfillment service provider may not be initialized whenever the user is interacting with the third-party application 104, but may be initialized responsive to such an input. Furthermore, in some examples, the fulfillment service provider can initialize responsive to detecting a particular word or words that serve to trigger initialization. In some examples, such word(s) can be selected by the third-party developers. In other examples, NLP, image recognition, and/or additional or alternative machine-trained models can be used to determine trigger words for triggering initialization. Upon initializing the fulfillment service provider, the fulfillment service provider can generate recommendations for fulfillment services, which can be presented to user(s) of the third-party application 104. In at least one example, a recommendation module 126, which can be included in the fulfillment module 108, can generate the recommendations and/or cause the recommendations to be presented to the user(s), e.g., via push notifications, interstitials, deep-links, text messages, or the like. Additional details are described below.

As is described below with reference to FIG. 2, the recommendation module 126 can determine a recommendation for a service, a merchant, and/or an item available via the fulfillment service provider. In at least one example, the recommendation module 126 can receive the context information and can determine a recommendation for a service, a merchant, and/or an item available via the fulfillment service provider. In at least one example, the recommendation module 126 can determine the recommendation based at least in part on information associated with the user and/or the third-party service provider. Additional details associated with accessing such information are described below with reference to FIG. 3.

In some examples, the fulfillment module 108 can determine context information associated with the interaction between the user and the third-party application 104 while the fulfillment service provider is initialized and the recommendation module 126 can determine recommendation(s) based on such context information. However, in an additional or alternative example, the user can submit a request for a recommendation, and the recommendation module 126 can determine the recommendation responsive to receiving the request. That is, in some examples, the recommendation module 126 can determine recommendations passively (e.g., without receiving a request) and dynamically (e.g., responsive to updated context information) and/or actively (e.g., responsive to a request).

In at least one example, recommendation module 126 can determine the recommendation using a machine-trained model. For instance, context information, information associated with the user and/or the third-party service provider, and so on can be input into a model previously trained using a machine-learning mechanism. The machine-trained model can output a recommendation for a service, a merchant, and/or an item available via the fulfillment service provider. Recommendations can be determined using additional or alternative techniques. For instance, the recommendation module 126 can utilize statistical models or any other model for generating a recommendation for a service, a merchant, and/or an item available via the fulfillment service provider.

In at least one example, the recommendation module 126 can send, via the API(s) 116, the recommendation to the third-party application 104. The third-party application 104 can present the recommendation to the user. In an additional or alternative example, the recommendation can be presented via the fulfillment service provider. That is, in such an example, the recommendation can be presented via another channel associated with the fulfillment service provider instead of, or in addition to, the third-party application 104. The recommendation can be sent to the user via a push notification, interstitial, text message or the like. The recommendation can be interactive to allow the user to engage with the recommendation while in the third-party application 104.

Figure 2:
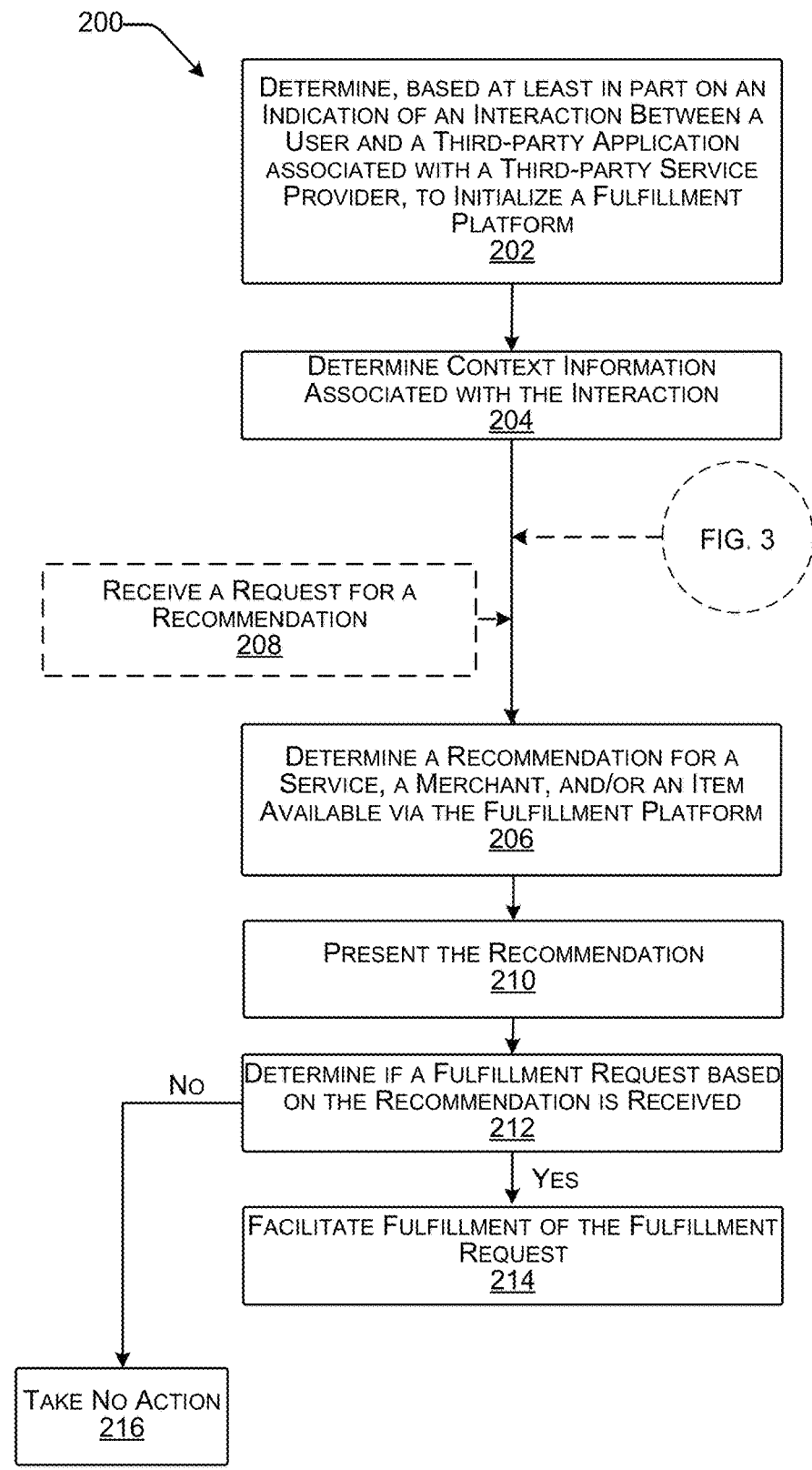
FIG. 2 illustrates an example process for determining a recommendation based on determining that a fulfillment service provider has been initialized in association with a third-party application, as described herein.

FIG. 2 illustrates an example process 200 for determining a recommendation based on determining that a fulfillment service provider has been initialized in association with a third-party application.

Block 202 illustrates determining, based at least in part on an indication of an interaction between a user and a third-party application associated with a third-party service provider, to initialize a fulfillment service provider. In at least one example, a user can interact with a third-party application 104, for example, via a user interface. The third-party application 104 can provide one or more services, as described herein. Examples of such services can include, but are not limited to, appointments, reservations, event planning, social networking, content providing, transportation, eCommerce, etc. The user can interact with the third-party application 104 to access such services. For instance, the user can interact with the third-party application 104 to make a reservation at a restaurant or a hotel. That is, while the user is interacting with the third-party application 104, the user can make a reservation at a restaurant or a hotel. Additionally or alternatively, the user can interact with the third-party application 104 to add items to a virtual cart (e.g., for delivery). That is, while the user interacts with the third-party application 104, the user can select items from an inventory of a merchant and add the items to a virtual cart (e.g., for delivery).

As described above, in at least one example, the fulfillment service provider can be initialized based at least in part on receiving an indication of an interaction between the user and the third-party application 104. That is, in at least one example, the fulfillment module 108 can receive an indication that the user is interacting with the third-party application 104, via the API(s) 116 for instance, and the fulfillment module 108 can initialize such to avail functionality and/or services of the fulfillment service provider to the third-party application 104. In some examples, the fulfillment service provider can be initialized responsive to an input received from a user via the third-party application 104. In such examples, the fulfillment service provider may not be initialized whenever the user is interacting with the third-party application 104, but may be initialized responsive to such an input. Furthermore, in some examples, the fulfillment service provider can initialize responsive to detecting a particular word or words that serve to trigger initialization. In some examples, such word(s) can be selected by the third-party developers. In other examples, NLP, image recognition, and/or additional or alternative machine-trained models can be used to determine trigger words for triggering initialization. As described above, in some examples, the events initialized by the fulfillment service provider are tied to state, e.g., tracked via a state machine, of the events initialized by the third-party application 104. For instance, the fulfillment module 108 can track the interaction between the user and the third-party application 104, e.g., through an API 116, to inform recommendations.

Block 204 illustrates determining context information associated with the interaction. When the fulfillment service provider is initialized, the fulfillment module 108 can determine context information associated with the interaction between the user and the third-party application 104. Context information can be information associated with interactions between the user and the third-party application 104 that help in determining the intent of the user. For example, context information can include date, time, location, event details associated with an event, one or more items added to a ticket or a virtual cart, subject matter of a conversation between the user and another user via the third-party application 104, subject matter of a content item (e.g., any item of content such as an image, a video, etc.) presented via the third-party application 104, subject matter of a social media post presented via the third-party application 104, a pick-up location, a drop-off location, a route between two locations, and so on. Interaction between the user and the third-party application 104 can be touch input, spoken input, haptic input, or any other input that enables the user to communicate his or her intent via the third-party application 104.

In at least one example, such context information can be communicated to the fulfillment module 108 via the API(s) 116. That is, the third-party application 104 can identify context information and can send the context information to the fulfillment module 108. In additional or alternative examples, the fulfillment module 108 can receive interaction data and can determine context information using machine-trained model(s). For instance, the fulfillment module 108 can analyze interaction data using NLP algorithms, image processing algorithms, and/or other machine-trained models to determine context information.

Block 206 illustrates determining a recommendation for a service, a merchant, and/or an item available via the fulfillment service provider. In at least one example, the recommendation module 126 can receive the context information and can determine a recommendation for a service, a merchant, and/or an item available via the fulfillment service provider. In at least one example, the recommendation module 126 can determine the recommendation based at least in part on information associated with the user and/or the third-party service provider. Additional details associated with accessing such information are described below with reference to FIG. 3.

In some examples, the recommendation module 126 can determine context information associated with the interaction between the user and the third-party application 104 while the fulfillment service provider is initialized and can determine recommendation(s) based on such context information. However, in an additional or alternative example, the user can submit a request for a recommendation, as illustrated in block 208, and the recommendation module 126 can determine the recommendation responsive to receiving the request. That is, in some examples, the recommendation module 126 can determine recommendations passively (e.g., without receiving a request) and dynamically (e.g., responsive to updated context information) and/or actively (e.g., responsive to a request).

In at least one example, the recommendation module 126 can determine the recommendation using a machine-trained model. For instance, context information, information associated with the user and/or the third-party service provider, and so on can be input into a model previously trained using a machine-learning mechanism. The machine-trained model can output a recommendation for a service, a merchant, and/or an item available via the fulfillment service provider. Recommendations can be determined using additional or alternative techniques. For instance, the recommendation module 126 can utilize statistical models or any other model for generating a recommendation for a service, a merchant, and/or an item available via the fulfillment service provider.

Block 210 illustrates presenting the recommendation. In at least one example, responsive to determining a recommendation, the recommendation module 126 can send, via the API(s) 116, the recommendation to the third-party application 104. The third-party application 104 can present the recommendation to the user. In an additional or alternative example, the recommendation can be presented via the fulfillment service provider. That is, in such an example, the recommendation can be presented via another channel associated with the fulfillment service provider instead of, or in addition to, the third-party application 104. The recommendation can be sent to the user via a push notification, interstitial, a deep-link, a text message, or the like. The recommendation can be interactive to allow the user to engage with the recommendation while in the third-party application.

Block 212 illustrates determining if a fulfillment request based on the recommendation is received. In examples where the user desires to take an action based on the recommendation presented via the third-party application 104, the third-party application 104 can transmit an indication of such to the fulfillment module 108 (e.g., via the API(s) 116). That is, the third-party application 104 can transmit a fulfillment request to the fulfillment module 108. A fulfillment request can be a request for services available via the fulfillment service provider, an item available via the fulfillment service provider, and so on. The fulfillment module 108 can receive the fulfillment request and can perform one or more operations to facilitate fulfillment of the fulfillment request, as illustrated in block 214. That is, the fulfillment module 108 can place orders (e.g., individual, group, etc.), schedule deliveries, make reservations, and/or perform other operations to effectuate fulfillment services available via the fulfillment service provider to fulfill the fulfillment request. In at least one example, the fulfillment module 108 can communicate to partners of the fulfillment service provider via the fulfillment user interface 114 to facilitate fulfillment of the fulfillment request. If the user does not desire to take an action based on the recommendation, the fulfillment module 108 can refrain from performing additional operations (e.g., take no action), as illustrated in block 216. In some examples, the interactions or lack thereof can be used to feed into the machine learning models that make the recommendations.

Figure 3:
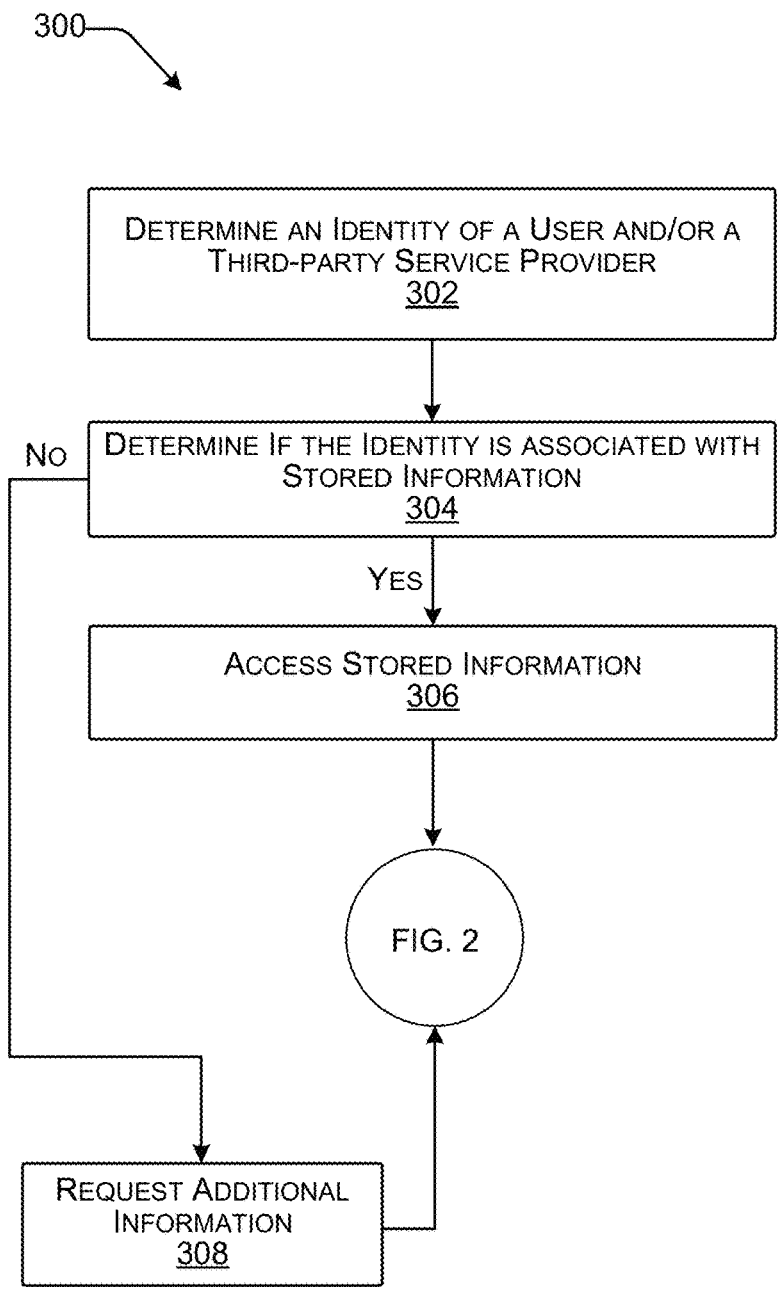
FIG. 3 illustrates an example process for accessing information associated with a user and/or a third-party service provider, which can be used for generating a recommendation for a service, a merchant, and/or an item available via a fulfillment service provider, as described herein.

FIG. 3 illustrates an example process 300 for accessing information associated with a user and/or a third-party service provider, which can be used for generating a recommendation for a service, a merchant, and/or an item available via a fulfillment service provider, as described herein.

Block 302 illustrates determining an identity of a user and/or a third-party service provider. In at least one example, the recommendation module 126 can receive context information associated with interactions between a user and a third-party application 104, which is associated with a third-party service provider. In at least one example, the context information can be provided via the API(s) 414 and can be associated with an identifier identifying a particular user and/or the third-party service provider. For instance, the third-party application 104 can provide (e.g., with permission from the user) a name of the user, an email address associated with the user, a telephone number of the user, a birthdate of the user, a combination of the foregoing, or any other information that can be used to identify the user. Additionally or alternatively, the third-party application 104 can transmit a token or other identifier that the third-party application 104 can use to identify the third-party service provider.

Block 304 illustrates determining if the identity is associated with stored information. As described below, the server(s) 102 can be associated with a datastore that stores, among additional or alternative types of data, profiles associated with users of the fulfillment service provider. Such "users" can include the user, referred to herein, as well as third-party service providers. For example, user profiles can store data indicating demographic information associated with the users (e.g., name, age, address, phone number, email address, occupation, children, etc.), interaction history (e.g., with one or more third-party applications and/or the fulfillment service provider), appointments and/or reservations (e.g., previously scheduled or scheduled for the future), etc. The third-party service provider profiles can include identifying information (e.g., name, address, phone number, website address, etc.), service information (e.g., what services the third-party service provider provides), authentication information (e.g., information used to authenticate the third-party service provider), etc.

In at least one example, the recommendation module 126 can compare the identifier with data stored in the datastore. If the identity is associated with stored information in the datastore, the recommendation module 126 can access the stored information, as illustrated in block 306, and can use the stored information for determining a recommendation as described above. However, if the identity is not associated with stored information, the recommendation module 126 can request additional information from the user and/or third-party service provider, as illustrated in block 308. For instance, the recommendation module 126 can send a request, via the API(s) 414, to prompt the user and/or third-party service provider to provide additional information that can be used to generate a recommendation and/or a profile, which can be stored in the datastore.

Figure 4:
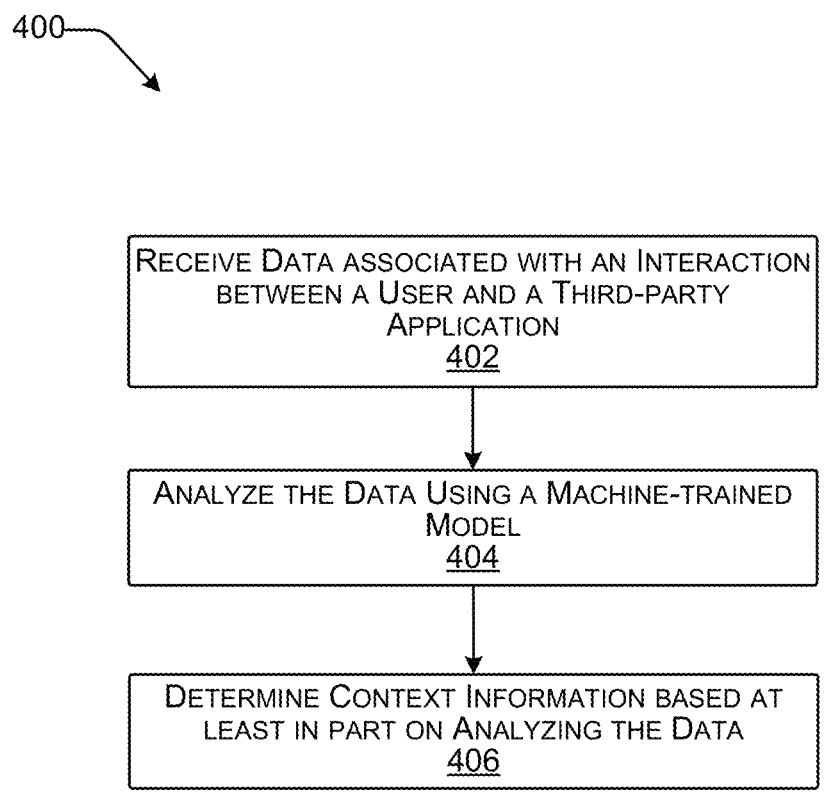
FIG. 4 illustrates an example process for determining context information, as described herein.

FIG. 4 illustrates an example process 400 for determining context information, as described herein.

Block 402 illustrates receiving data associated with an interaction between a user and a third-party application. Based at least in part on determining that the fulfillment service provider has been initialized, the fulfillment module 108 can determine context information associated with the interaction between the user and the third-party application 104. In at least one example, interaction between the user and the third-party application 104 can be touch input, spoken input, haptic input, or any other input that enables the user to communicate his or her intent via the third-party application 104. In at least one example, the fulfillment module 108 can receive interaction data via the API(s) 116.

Block 404 illustrates analyzing the data using a machine-trained model. In at least one example, the fulfillment module 108 can receive interaction data via the API(s) 116 and can determine context information using a machine-trained model. For instance, the fulfillment module 108 can analyze interaction data using NLP algorithms to determine context information, as illustrated in block 406. In at least one example, the fulfillment module 108 can utilize NLP algorithms to determine syntax associated with interactions data (e.g., part-of-speech tagging, parsing, stemming, word segmentation, terminology extraction, etc.), semantics associated with interactions data (e.g., lexical semantics, named entity recognition, natural language generation, natural language understanding, relationship extraction, sentiment analysis, etc.), discourse associated with interactions data (e.g., summarization, co-reference resolution, discourse analysis, etc.), and so on. Such NLP can enable the fulfillment module 108 to determine context information associated with interactions between the user and the third-party application 104.

In additional or alternative examples, the fulfillment module 108 can analyze interaction data using image processing algorithms and/or any other machine-trained model(s) to determine context information, as illustrated in block 406. For instance, the fulfillment module 108 can utilize image processing algorithms to perform object recognition, object classification, and so on, which can be used for determining context information. Additional and/or alternative machine-trained model(s) can be used for determining context information, as described herein.

As described above, context information can be information associated with interactions between the user and the third-party application 104 that helps in determining the intent of the user. For example, context information can include date, time, location, event details associated with an event, one or more items added to a ticket or a virtual cart, subject matter of a conversation between the user and another user via the third-party application 104, subject matter of a content item presented via the third-party application 104, subject matter of a social media post presented via the third-party application 104, a pick-up location, a drop-off location, a route between two locations, and so on. The context information can also indicate which of the one or more fulfilment services should be called via APIs.

Figure 5:
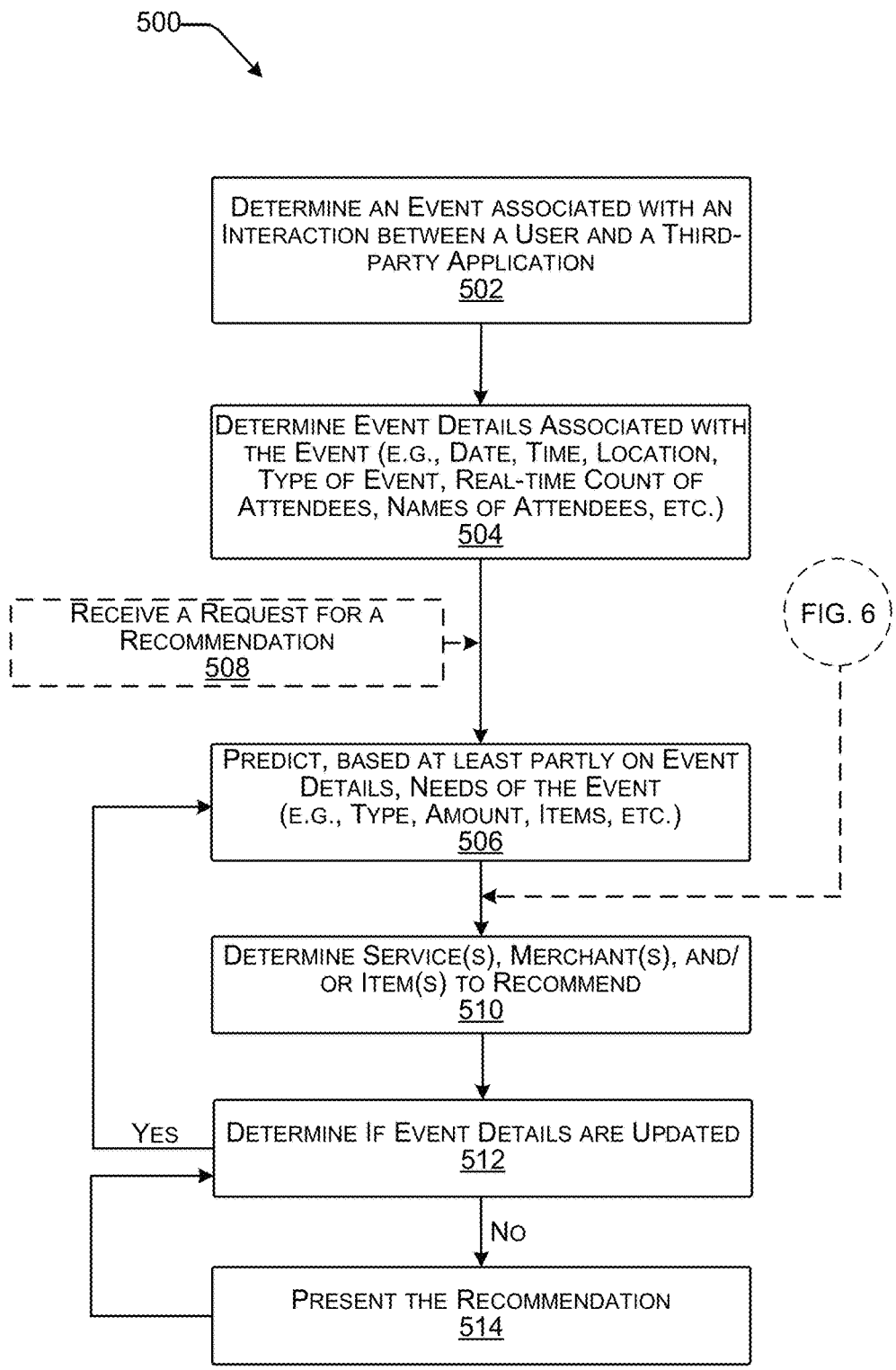
FIG. 5 illustrates an example process for determining a recommendation for an event, as described herein.

FIG. 5 illustrates an example process 500 for determining a recommendation for an event, as described herein. As described above, the third-party application 104 can be associated with a third-party service provider that provides one or more services. Examples of such services include, but are not limited to, appointments, reservations, event planning, social networking, content providing, transportation, eCommerce, peer-to-peer payments, etc. Process 500 is directed to an example wherein the third-party application 104 is associated with an event planning service. Additional examples of integrations between third-party applications and the fulfillment service are described below with reference to FIGS. 7-13.

Block 502 illustrates determining an event associated with an interaction between a user and a third-party application. In at least one example, a user can interact with a third-party application 104 to access event planning services, as described above. In at least one example, the fulfillment module 108 can receive an indication that the user is interacting with the third-party application 104, via the API(s) 116 for instance, and the fulfillment module 108 can initialize such to avail functionality and/or services of the fulfillment service provider to the third-party application 104.

Based at least in part on the fulfillment service provider being initialized, the fulfillment module 108 can determine context information associated with the interaction between the user and the third-party application 104. Context information can be information associated with interactions between the user and the third-party application 104 that help in determining the intent of the user. In at least one example, such context information can be communicated to the fulfillment module 108 via the API(s) 116. That is, the third-party application 104 can identify context information and can send the context information to the fulfillment module 108. In additional or alternative examples, the fulfillment module 108 can receive interaction data and can determine context information using a machine-trained model. For instance, the fulfillment module 108 can analyze interaction data using NLP algorithms, image processing algorithms, and/or any other machine-trained model to determine context information.

In at least one example, the context information can indicate that the user is planning an event or that an event is otherwise occurring.

Block 504 illustrates determining event details associated with the event. In at least one example, the fulfillment module 108 can analyze the content information to determine event details associated with the event. Event details can include, but are not limited to, a date, a time, a location, a budget, a theme, an invitee list, etc. In some examples, the invitee list can comprise contact information for sending electronic invites and receiving electronic RSVPs, which can generate a real-time count of invitees planning to attend the event and an indication of which invitees are planning to attend the event. That is, in such examples, event details can include information about how many invitees are planning to attend the event and who is planning on attending the event. In at least one example, event details can be input into the third-party application 104 (e.g., by the user). In other examples, the user can upload a digital invitation or other digital content item and the event details can be determined based at least in part on analyzing the content of the digital invitation or other digital content item.

Block 506 illustrates predicting, based at least partly on event details, needs of the event. In at least one example, the fulfillment module 108 can predict needs of the event based at least partly on the event details. In some examples, the fulfillment module 108 can leverage a machine-trained model, statistical model, and/or other models for predicting needs of the event. Such needs can include food-based needs, including but not limited to, a menu for the event, food items to be ordered for the event, a quantity of food to be ordered for the event, and the like.

In some examples, the fulfillment module 108 can predict needs of the event based on determining the event associated with the interaction between the user and the third-party application 104. However, in an additional or alternative example, the user can submit a request for a recommendation, as illustrated in block 508, and the fulfillment module 108 can predict the needs of the event responsive to receiving the request. That is, in some examples, the fulfillment module 108 can predict needs of the event passively (e.g., without receiving a request) and dynamically (e.g., responsive to updated event details) and/or actively (e.g., responsive to a request).

Block 510 illustrates determining service(s), merchant(s), and/or item(s) to recommend to the user. In at least one example, responsive to predicting the needs of the event, the fulfillment module 108 can determine a recommendation to fulfill at least some of the needs of the event. For example, responsive to predicting the needs of the event, the recommendation module 126 can identify restaurants for providing food for the event, a menu for the event (e.g., a combination of items), individual food items for the event, a quantity of food to be ordered for the event, and the like.

In some examples, the recommendation can be based on the event details. For example, in at least one example, the recommendation module 126 can determine a location of the event and can identify one or more restaurants for providing food for the event based on the location of the event. As an example, the recommendation module 126 can select one or more restaurants that have a location that is within a threshold distance of the location of the event. Additionally or alternatively, the recommendation module 126 can utilize the date and/or time to recommend different restaurants, menus, food items, quantities, and so forth. For example, an event in the morning might warrant pastries and mimosas instead of BBQ and sodas. Or, a summer event might warrant a different menu than a winter event. Additional event details such as budget, theme, and so on can be used for determining the recommendation.

Furthermore, in at least one example, a number of invitees planning to attend the event can be used by the recommendation module 126 to determine an amount of food to recommend (e.g., which can be based on the predicted needs for the event). In some examples, the invitee list can influence recommendations. For example, if one or more invitees planning to attend the event are vegan, the recommendation module 126 can recommend vegan restaurants, vegan menu items, or the like. Further, if certain invitees are allergic to a particular ingredient, the recommendation module 126 can utilize such knowledge in determining which restaurants to recommend, which menus to recommend, which food items to recommend, and so on.

In some examples, the recommendation module 126 can utilize additional or alternative signals in determining recommendations. In at least one example, the recommendation module 126 can access inventory information associated with one or more restaurants, and the recommendation module 126 can determine a recommendation based at least in part on the availability of particular items, etc. In additional or alternative examples, the recommendation module 126 can provide details associated with an event to one or more restaurants that are associated with the fulfillment service provider and the restaurant(s) can submit bids for providing food-based services for the event. Additional details are described below with reference to FIG. 6.

Block 512 illustrates determining if the event details are updated. In some examples, event details can change between when the event is created and when the event occurs. For instance, the location can change due to availability of the location. Or, a budget as originally indicated can increase or decrease. In some examples, a number of invitees that plan to attend the event can change and/or which invitees plan to attend the event can change. In at least one example, prior to outputting a recommendation, the fulfillment module 108 can determine if the event details are updated (e.g., have changed since most recently accessed). Based at least in part on determining that the event details are updated, the process 500 can return to block 508, to predict, based at least partly on updated event details, needs of the event. Accordingly, the fulfillment module 108 can determine whether the recommendation should be updated based on the predicted needs and, if the recommendation should be updated, the recommendation module 126 can determine an updated recommendation.

Based at least in part on determining that the event details are not updated, the recommendation module 126 can present the recommendation, as illustrated in block 514. In at least one example, responsive to determining a recommendation, the recommendation module 126 can send, via the API(s) 116) the recommendation to the third-party application 104. The third-party application 104 can present the recommendation to the user. In an additional or alternative example, the recommendation can be presented via the fulfillment service provider. That is, in such an example, the recommendation can be presented via another channel associated with the fulfillment service provider instead of, or in addition to, the third-party application 104. In some examples, the process 500 can return to block 512 to determine if event details are updated after the recommendation is presented, for instance at a particular frequency, after a lapse of a predetermined period of time, upon receiving a request, and so on. In some examples, if the event details are updated, the process can return to block 506 to determine the predicted needs of the event in view of the updated event details. If the event details are not updated, the recommendation can continue to be presented until the recommendation module 126 determines to terminate the recommendation (e.g., after a lapse of a predetermined period of time, etc.) or the user otherwise interacts with the third-party application 104 (e.g., takes an action based on the recommendation, closes the third-party application 104, exits the third-party application, etc.).

In examples where the user desires to take an action based on the recommendation presented via the third-party application 104, the third-party application 104 can transmit an indication of such to the fulfillment module 108 (e.g., via the API(s) 116). The fulfillment module 108 can receive the indication and perform one or more operations to facilitate the action, as described above. That is, the fulfillment module 108 can place orders (e.g., individual, group, etc.), schedule deliveries, make reservations, and/or perform other operations to effectuate services available via the fulfillment service provider. Additional details are described below.

Figure 6:
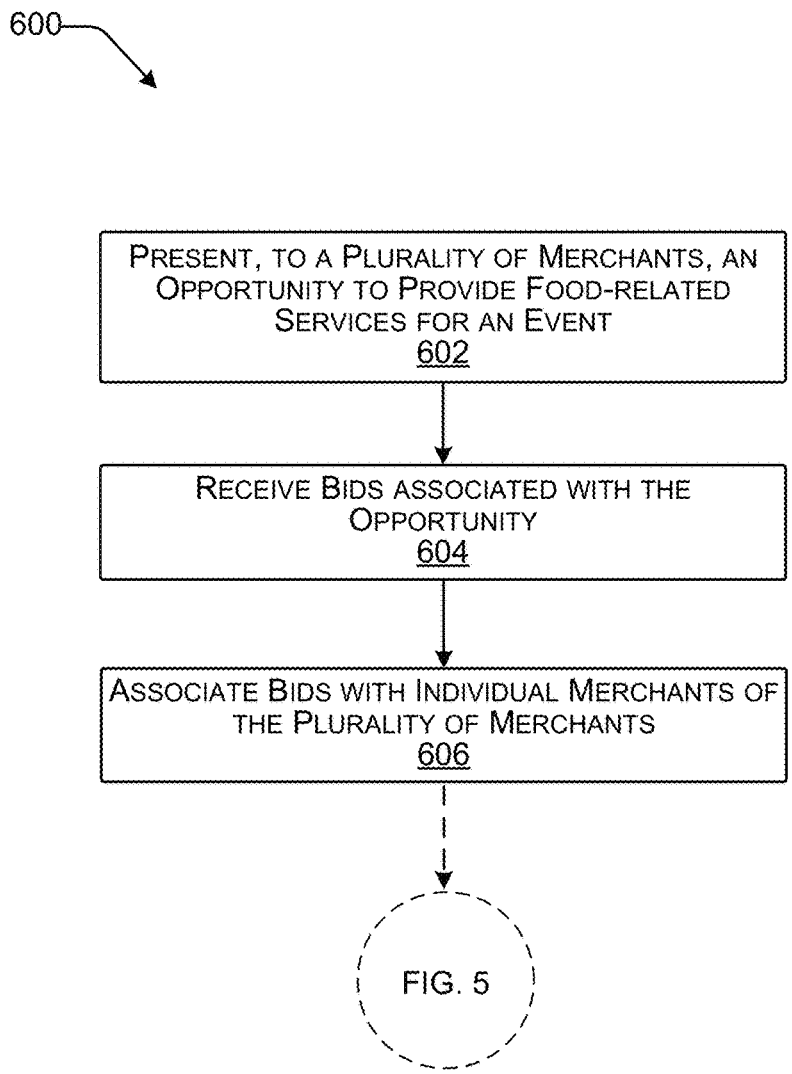
FIG. 6 illustrates an example process for receiving bids from merchants, which can be used to determine a recommendation, as described herein.

FIG. 6 illustrates an example process 600 for receiving bids from merchants, which can be used to determine a recommendation, as described herein.

Block 602 illustrates presenting, to a plurality of merchants, an opportunity to provide food-related services for an event. In at least one example, the fulfillment module 108 can send to a plurality of merchants, which can be partners of the fulfillment service provider, an indication of an opportunity to provide food-related services for an event. In some examples, the indication can include event details, including but not limited to, a date, a time, a location, a budget, a theme, etc. In at least one example, the plurality of merchants can be selectively chosen, for example, based on geolocation, cuisine, price-point, etc. The fulfillment module 108 can send the indication to devices 112 corresponding to the plurality of merchants and the indication can be presented via respective instances of the fulfillment user interface 114.

Block 604 illustrates receiving bids associated with the opportunity. In at least one example, responsive to receiving the indications, one or more of the merchants can submit bids for providing fulfillment services associated with the event. For instance, a merchant can submit a proposal for satisfying the food-based needs of the event (e.g., menu, quantity of food, etc.), a cost associated with providing such services, terms for providing such services, and so on.

Block 606 illustrates associating the bids with individual merchants of the plurality of merchants. In at least one example, responsive to receiving the bids from the merchants, the fulfillment module 108 can associate such bids with individual merchants. In at least one example, the bids can be used by the fulfillment module 108 in determining service(s), merchant(s), and/or item(s) to recommend, as described above with reference to FIG. 5. In some instances, the fulfillment module 108 can use event specifics to optimize bids with respect to event specifics.

While FIG. 6 is directed to presenting an opportunity to provide food-related services for an event, the process 600 can similarly be applicable to any example of techniques described herein (e.g., retail, eCommerce, etc.).

FIGS. 7-13 illustrate example graphical user interfaces (GUIs) for facilitating techniques as described herein. In at least one example, such GUIs can be presented, by the third-party application 104, via a display associated with the third-party application 104. The content and/or presentation of the example GUIs in FIGS. 7-13 are only examples and should not be construed as limiting. That is, additional or alternative content and/or additional or alternative presentations can be used to present information as described herein. Furthermore, in some examples, such information can be output via another type of user interface such as via a speech output, a haptic output, or the like. In at least one example, recommendations can additionally or alternatively be presented via the fulfillment service provider (e.g., via the fulfillment user interface 114). The GUIs may include at least one interactive component to allow the user to engage or otherwise provide input for the fulfillment service provider to generate and/or update recommendations. In some cases, on actuation of the interactive component, the user is able to avail additional services, typically outside the purview of the third-party application, without having to create a separate account with the fulfilment provider or without exiting the third-party application. The interactive component can appear and disappear as the context changes. In some cases, the interactive component may be persistent with the underlying content changing as the context changes. The interactive component can be presented as a push-notification, or an interstitial covering at least a portion of the GUI. The placement of the interactive component may also be context based, for example, the food ordering recommendation may only appear at the check-out page. In at least one example, the placement and/or format may be in a manner that allows for the content to blend in with the rest of the content on the third-party application.

Figure 7A:
FIG. 7A illustrates an example graphical user interface (GUI) for presenting a recommendation generated and/or otherwise provided by a fulfillment service provider, as described herein.

FIG. 7A illustrates an example graphical user interface (GUI) 700 for presenting a recommendation generated and/ or otherwise provided by a fulfillment service provider. In at least one example, the GUI 700 can be presented via the third-party application 104 (e.g., a user interface associated therewith), on a user device such as the user device 106. In FIG. 7A the third-party application 104 can provide functionality for facilitating an event planning service. As illustrated, a user can input event details 702, including but not limited to, a name of the event, a type of event (e.g., baby shower), a date of the event, a time of the event, a budget associated with the event, and so forth. In some examples, the event details 702 can be used to generate an electronic invitation (an "evite"), which can be sent to invitees of the event (e.g., via email, text message, and the like). The evites can be associated with a mechanism that enables the invitees to RSVP to the event. That is, an invitee can indicate that they plan to attend (e.g., Yes, I'll attend (Y)), they do not plan to attend (e.g., No, I will not attend (N)), and so on. The evites can enable additional or alternative interaction, for example, the invitee can provide an indication of whether they are bringing guests, food preferences, allergies, etc. In at least one example, the third-party application 104 can track RSVP responses 704 in near-real-time, which can provide a near-real-time count of invitees planning to attend the event and an indication of which invitees plan to attend the event.

In at least one example, the fulfillment module 108 can detect that the fulfillment service provider has been initialized based at least in part on an indication of an interaction between the user and the third-party application 104. Accordingly, the fulfillment module 108 can determine context information associated with the interaction between the user and the third-party application 104. In at least one example, the fulfillment module 108 can determine context information based at least in part on the event details 702. The recommendation module 126 can utilize the event details to generate a recommendation 706 for fulfillment services, which can be presented via the third-party application 104 (e.g., a user interface associated therewith). In at least one example, the recommendation 706 can recommend a set of merchants for catering the event. In additional or alternative examples, the recommendation 706 can recommend a menu for the event, food items to be ordered for the event, a quantity of food to be ordered for the event, and the like. Or, in at least one example, the user can interact with the recommendation 706 through a series of interactions to receive additional or alternative recommendations directed to a menu for the event, food items to be ordered for the event, a quantity of food to be ordered for the event, and the like.

A user can interact with the recommendation 706 to learn more about the recommendations and/or effectuate an order via the fulfillment service provider. For instance, in at least one example, the recommendation 706 can be associated with a control or other mechanism, the actuation of which sends a notification to the fulfillment module 108 to generate instructions for presenting additional or alternative information. For instance, the fulfillment module 108 can receive the notification and can generate an instruction to cause information associated with each of the recommended merchants to be presented via the GUI 700. Additionally or alternatively, each of the recommended merchants can be associated with a control or other mechanism that when actuated, cause a notification to be sent to the fulfillment module 108 and the fulfillment module 108 can generate instructions for presenting a corresponding menu, a recommended subset of items from the corresponding menu, and the like to enable the user to consider whether to use the fulfillment service provider for catering the event.

Figure 7B:
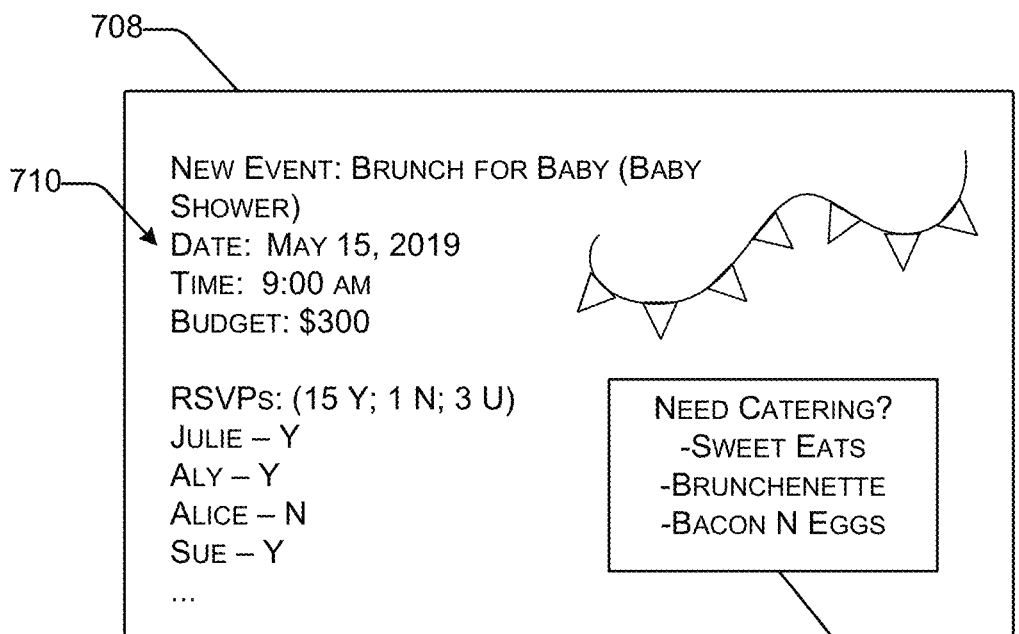
FIG. 7B illustrates an example GUI for presenting a recommendation generated and/or otherwise provided by a fulfillment service provider, as described herein.

As described above, the recommendation 706 can be determined based at least in part on event details associated with the event. In the example GUI of FIG. 7A, the event is a taco themed baby shower occurring in the afternoon. Accordingly, the fulfillment module 108 can generate a recommendation for serving cuisine related to tacos. However, in FIG. 7B, which illustrates an example GUI 708, the event details 710 are different than the event details 702 in FIG. 7A. Accordingly, the recommendation 712 is also different. As illustrated, the event associated with FIG. 7B is a brunch baby shower scheduled for the morning. Thus, the catering options recommended via the recommendation 712 are associated with brunch cuisine instead of cuisine related to tacos.

In some examples, when the recommendation 706 includes a menu for the event, food items to be ordered for the event, a quantity of food to be ordered for the event, and the like, as RSVPs are received, the recommendation module 126 can update the recommendation 706. For example, as the number of invitees that plan to attend the event increases, a recommended quantity of food can increase. Additionally or alternatively, as the guest list changes (e.g., new attendees accept or decline), the recommendation module 126 can recommend changes to the menu for the event, items to be ordered for the event, and so on. In at least one example, the recommendation module 126 can generate recommendations based on food preferences of the attendees, allergies of the attendees, and the like.

In at least one example, a user can choose to have multiple merchants cater the event. In such an example, the fulfillment module 108 can manage a catering event with multiple merchants. Further, in some examples, the user can choose a single restaurant for catering an event, but the fulfillment module 108 can throttle between multiple restaurants (e.g., of the same or different merchants) to better manage catering needs of the event. In such examples, the fulfillment module 108 can send catering instructions to multiple restaurants and can facilitate delivery schedules, pick-up schedules, and so forth.

In some examples, the third-party application 104 can facilitate capturing payment information of the user for settling the cost of the service(s) and/or item(s) ordered by the user. In other examples, the fulfillment module 108 can request and receive payment information of the user (e.g., via a secure payment mechanism) for settling the cost of the service(s) and/or item(s) ordered by the user. Which entity (e.g., the third-party application 104 or the fulfillment service provider) captures payment information for settling the transaction is a designation that can be programmed by a developer associated with the third-party application 104.

Figure 8:
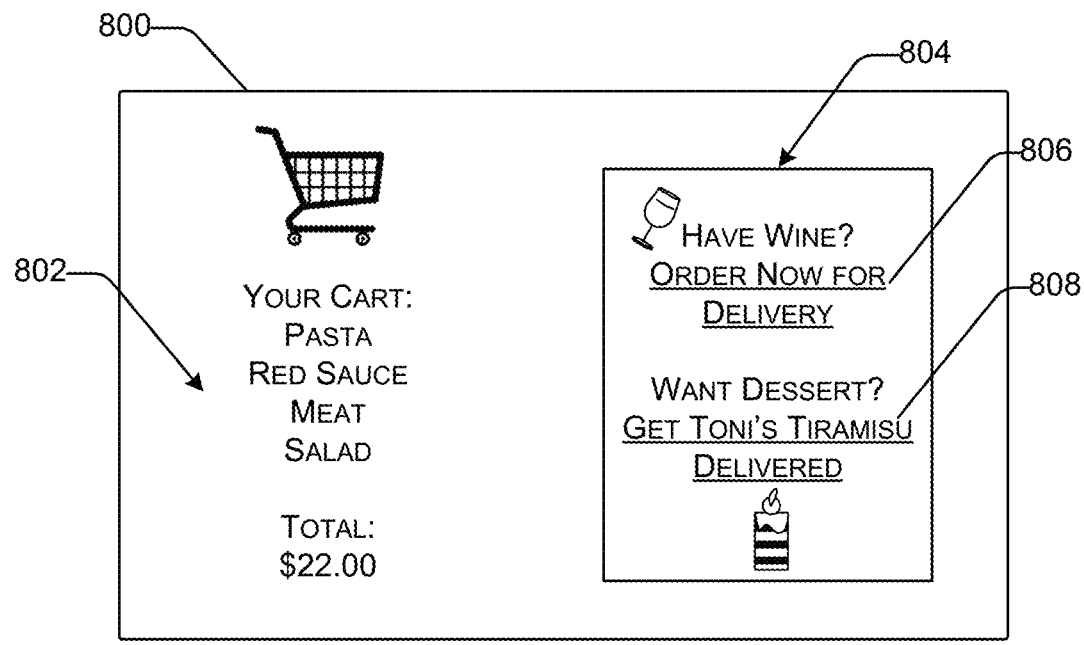
FIG. 8 illustrates an example GUI for presenting a recommendation generated and/or otherwise provided by a fulfillment service provider, as described herein.

FIG. 8 illustrates an example GUI 800 for presenting a recommendation generated and/or otherwise provided by a fulfillment service provider. In at least one example, the GUI 800 can be presented via the third-party application 104 (e.g., a user interface associated therewith). In FIG. 8 the third-party application 104 can be associated with an ecommerce service provider and can provide functionality for generating a virtual cart (e.g., a data structure associated with an ecommerce service provider that stores indications of items selected by users for eventual purchase via the ecommerce service provider). In at least one example, a user's virtual cart 802 can include pasta, red sauce, meat, and salad.

In at least one example, the fulfillment module 108 can detect that the fulfillment service provider has been initialized based at least in part on an indication of an interaction between the user and the third-party application 104. Accordingly, the fulfillment module 108 can determine context information associated with the interaction between the user and the third-party application 104. In at least one example, the fulfillment module 108 can determine context information based at least in part on item(s) that are added to the virtual cart 802. For instance, the fulfillment module 108 can utilize image recognition or NLP techniques to determine the item(s) that are added to the virtual cart 802 (e.g., from image representations of the item(s) or descriptive text associated with the item(s)). Further, context information can include a geographic location associated with delivery of item(s) in the virtual cart 802, a date, a time of day, and so on.

The recommendation module 126 can generate one or more recommendations 804 that can be surfaced via the third-party application 104 (e.g., a user interface associated therewith). For example, the recommendation module 126 can analyze the context information to determine one or more recommendations 804 for the user. In at least one example, the recommendation module 126 can utilize a machine-trained model to generate the one or more recommendations 804. The one or more recommendations 804 can include a recommendation for a service available via a fulfillment service provider, a recommendation for a merchant associated with the fulfillment service provider, a recommendation for an item associated with the fulfillment service provider, and so on. In at least one example, the recommendation(s) 804 can be context-dependent such that the service(s), merchant(s), and/or item(s) depend on the context information associated with initialization of the fulfillment service provider.

As an example, the items in the virtual cart 802 are related to an Italian dinner. Previous transaction history and/or interaction history can indicate that users that buy items related to Italian dinners also purchase wine and/or an Italian dessert (e.g., tiramisu). That is, data associated with previous transactions and/or interactions can be used to train a machine-trained model that can output a recommendation based on observed trends in the data associated with the previous transactions and/or interactions. Thus, as illustrated in FIG. 8, the one or more recommendations 804 can include a recommendation to have wine delivered and/or a recommendation to have dessert delivered.

In at least one example, a user can interact with the recommendation(s) 804 to order wine for delivery and/or order tiramisu. For instance, the recommendation(s) 804 can be associated with mechanisms 806, 808 that, when actuated, enable the user to order wine to be delivered and/or order tiramisu to be delivered. Responsive to the user actuating one of the mechanisms 806, 808, the fulfillment module 108 can receive a request for wine to be delivered (responsive to the mechanism 806 being actuated) and/or a request to order tiramisu to be delivered (responsive to the mechanism 808 being actuated). The fulfillment module 108 can facilitate delivery of the item(s) to the user. For example, the fulfillment module 108 can send an instruction to a merchant that delivers wine and/or Toni's (the merchant that makes the tiramisu) (via the fulfillment user interface 114). The respective merchants can receive the instruction and can deliver the wine and/or tiramisu. In some examples, the respective merchants can provide a confirmation of the instruction, an estimated time for delivery, etc. In at least one example, the user can choose to have both the wine and the tiramisu delivered. In such an example, the fulfillment module 108 can batch the orders and coordinate delivery, for instance, via a single courier. That is, in at least one example, the fulfillment module 108 can receive requests to access services and/or items from multiple merchants and, in such an example, the fulfillment module 108 can manage fulfillment by the multiple merchants.

In some examples, the cost of the ordered item(s) can be added to the total cost associated with the virtual cart 802, in which the third-party application 104 can facilitate capturing payment information of the user. In other examples, the fulfillment module 108 can request and receive payment information of the user (e.g., via a secure payment mechanism) for settling the cost of the wine delivery and/or tiramisu delivery. Which entity (e.g., the third-party application 104 or the fulfillment service provider) captures payment information for settling the transaction is a designation that can be programmed by a developer associated with the third-party application 104.

While FIG. 8 is directed to an ecommerce example wherein a user is adding grocery items to a virtual cart, techniques described above with reference to FIG. 8 can be additionally or alternatively applicable to any ecommerce example. For instance, techniques described above can be applicable to item(s) added to a ticket, item(s) added to an order, and the like via an ecommerce service provider.

Figure 9:
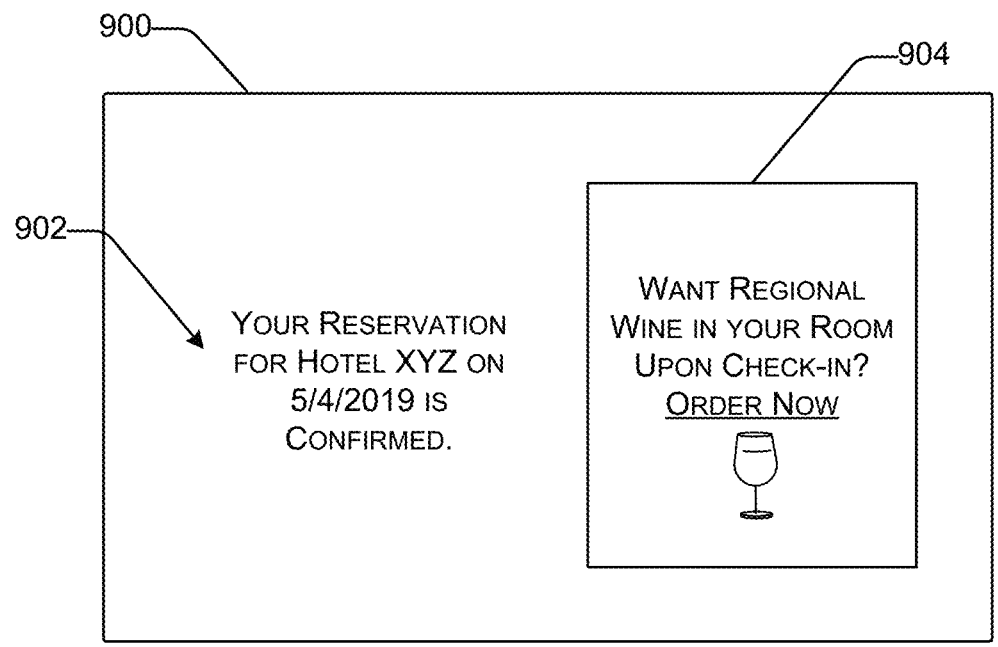
FIG. 9 illustrates an example GUI for presenting a recommendation generated and/or otherwise provided by a fulfillment service provider, as described herein.

FIG. 9 illustrates an example GUI 900 for presenting a recommendation generated and/or otherwise provided by a fulfillment service provider. In at least one example, the GUI 900 can be presented via the third-party application 104 (e.g., a user interface associated therewith). In FIG. 9 the third-party application 104 can be associated with a service provider that enables users to make reservations, schedule appointments, and so on (e.g., hotel reservations, spa appointments, etc.). As illustrated in FIG. 9, the third-party application 104 can present a confirmation 902 for a reservation at a hotel, Hotel XYZ.

In at least one example, the fulfillment module 108 can detect that the fulfillment service provider has been initialized based at least in part on an indication of an interaction between the user and the third-party application 104. Accordingly, the fulfillment module 108 can determine context information associated with the interaction between the user and the third-party application 104. In at least one example, the fulfillment module 108 can determine context information based at least in part on the confirmation. For instance, the fulfillment module 108 can utilize NLP techniques to determine details of the reservation. Such details can include a merchant name, merchant location, date of reservation, length of reservation, etc.

The recommendation module 126 can generate one or more recommendations 904 that can be surfaced via the third-party application 104 (e.g., a user interface associated therewith). For example, the recommendation module 126 can analyze the context information to determine one or more recommendations 904 for the user. In at least one example, the recommendation module 126 can utilize a machine-trained model to generate the one or more recommendations 904. The one or more recommendations 904 can include a recommendation for a service available via a fulfillment service provider, a recommendation for a merchant associated with the fulfillment service provider, a recommendation for an item associated with the fulfillment service provider, and so on. In at least one example, the recommendation(s) 904 can be context-dependent such that the service(s), merchant(s), and/or item(s) depend on the context information associated with initialization of the fulfillment service provider. In some examples, the service (s), merchant(s), and/or item(s) recommended can be selected based on previous transaction data associated with the user, identified user preferences, etc.

As illustrated in FIG. 9, the one or more recommendations 904 can include a recommendation to order regional wine for delivery at the hotel room upon check-in at the hotel. Alternatively, the fulfillment module 108 can generate a recommendation for food delivery by merchants within a threshold distance of the hotel, reservations for merchants within a threshold distance of the hotel, and so on. In at least one example, a user can interact with the recommendation(s) 904 to order regional wine, that can be delivered to the user's hotel room upon (or prior to) check-in. For instance, the recommendation(s) 904 can be associated with a mechanism that, when actuated, enables the user to order the regional wine. Responsive to the user actuating the mechanism, the fulfillment module 108 can receive an order for the regional wine. The fulfillment module 108 can facilitate fulfillment of the order. For example, the fulfillment module 108 can send an instruction to one or more merchants that can fulfill and, in some examples, deliver the regional wine. The merchant(s) can receive the instruction and can fulfill the order, and in some examples, deliver the order. In some examples, the merchant(s) can provide a confirmation of the instruction, an estimated time for delivery, etc.

In some examples, the third-party application 104 can facilitate capturing payment information of the user for settling the cost of the service(s) and/or item(s) ordered by the user. In other examples, the fulfillment module 108 can request and receive payment information of the user (e.g., via a secure payment mechanism) for settling the cost of the service(s) and/or item(s) ordered by the user. Which entity (e.g., the third-party application 104 or the fulfillment service provider) captures payment information for settling the transaction is a designation that can be programmed by a developer associated with the third-party application 104.

While FIG. 9 is directed to a reservation example, similar techniques can be applicable to examples where an appointment, or any other scheduling mechanism, is used to reserve space, services, etc. at a future date and/or time.

Figure 10:
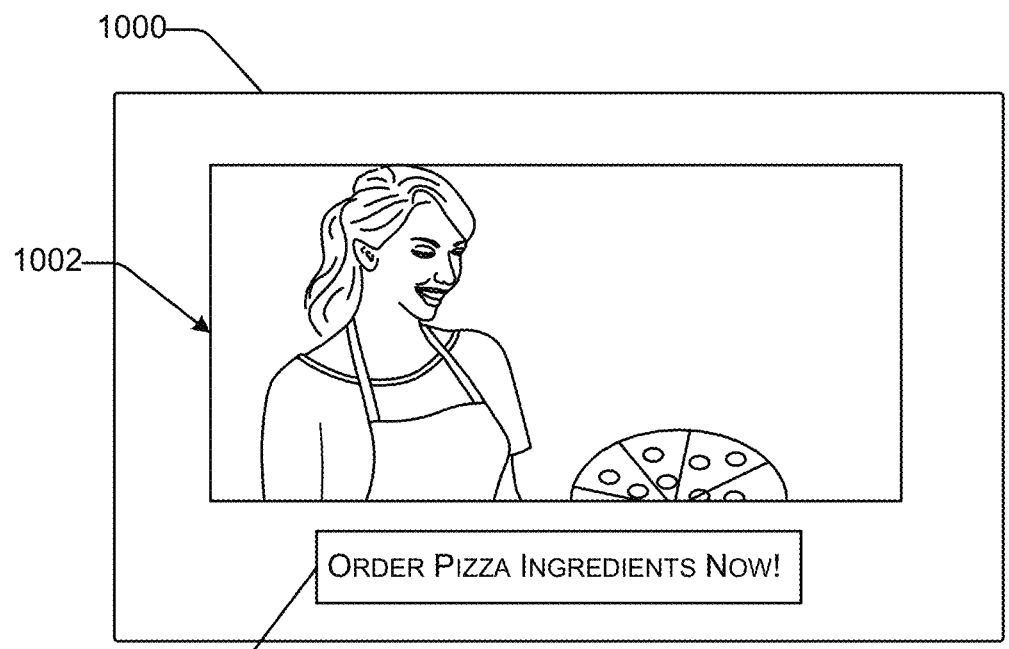
FIG. 10 illustrates an example GUI for presenting a recommendation generated and/or otherwise provided by a fulfillment service provider, as described herein.

FIG. 10 illustrates an example GUI 1000 for presenting a recommendation generated and/or otherwise provided by a fulfillment service provider. In at least one example, the GUI 1000 can be presented via the third-party application 104 (e.g., a user interface associated therewith). In FIG. 10 the third-party application 104 can be associated with a service provider that provides content, such as video content, image content, and so forth. As illustrated in FIG. 10, the third-party application 104 can present a video 1002 of a chef making a pizza.

In at least one example, the fulfillment module 108 can detect that the fulfillment service provider has been initialized based at least in part on an indication of an interaction between the user and the third-party application 104. Accordingly, the fulfillment module 108 can determine context information associated with the interaction between the user and the third-party application 104. In at least one example, the fulfillment module 108 can determine context information based at least in part on the video 1002. For instance, the fulfillment module 108 can utilize image recognition or NLP techniques to determine the subject matter of the content (e.g., from the video itself or descriptive text associated with the video). Further, context information can include a location of the user, a date, a time of day, and so on.

The recommendation module 126 can generate one or more recommendations 1004 that can be surfaced via the third-party application 104 (e.g., a user interface associated therewith). For example, the recommendation module 126 can analyze the context information to determine one or more recommendations 1004 for the user. In at least one example, the recommendation module 126 can utilize a machine-trained model to generate the one or more recommendations 1004. The one or more recommendations 1004 can include a recommendation for a service available via a fulfillment service provider, a recommendation for a merchant associated with the fulfillment service provider, a recommendation for an item associated with the fulfillment service provider, and so on. In at least one example, the recommendation(s) 1004 can be context-dependent such that the service(s), merchant(s), and/or item(s) depend on the context information associated with initialization of the fulfillment service provider.

As illustrated in FIG. 10, subject matter of the video 1002 is associated with making a pizza. Thus, the recommendation module 126 can generate a recommendation to order ingredients to order a pizza. Alternatively, the recommendation module 126 can generate a recommendation to have a pizza delivered, one or more merchants that sell pizza, to make a reservation at a restaurant that serves pizza, or the like. In at least one example, a user can interact with the recommendation(s) 1004 to order pizza ingredients. For instance, the recommendation(s) 1004 can be associated with a mechanism that, when actuated, enables the user to order pizza ingredients. Responsive to the user actuating the mechanism, the fulfillment module 108 can receive an order for pizza ingredients. The fulfillment module 108 can facilitate fulfillment of the order. For example, the fulfillment module 108 can send an instruction to one or more merchants that can fulfill and, in some examples, deliver the order for pizza ingredients. The merchant(s) can receive the instruction and can fulfill the order, and in some examples, deliver the order. In some examples, the merchant(s) can provide a confirmation of the instruction, an estimated time for delivery, etc.

In some examples, the third-party application 104 can facilitate capturing payment information of the user for settling the cost of the service(s) and/or item(s) ordered by the user. In other examples, the fulfillment module 108 can request and receive payment information of the user (e.g., via a secure payment mechanism) for settling the cost of the service(s) and/or item(s) ordered by the user. Which entity (e.g., the third-party application 104 or the fulfillment service provider) captures payment information for settling the transaction is a designation that can be programmed by a developer associated with the third-party application 104.

Figure 11:
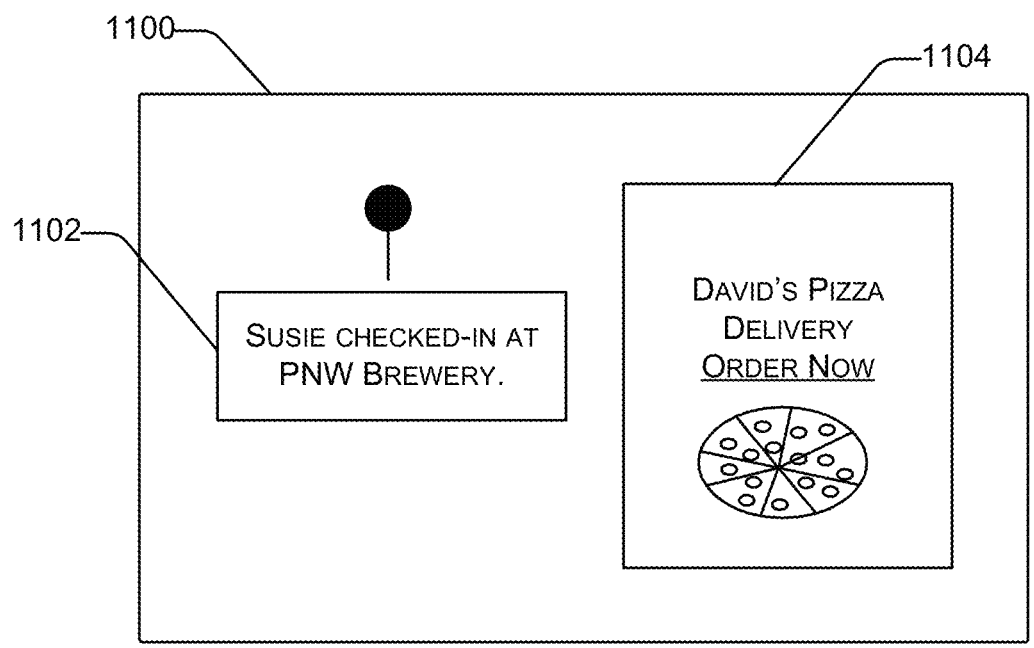
FIG. 11 illustrates an example GUI for presenting a recommendation generated and/or otherwise provided by a fulfillment service provider, as described herein.

While FIG. 10 is directed to an example whereby the third-party application 104 is a content provider, in additional or alternative examples, the third-party application 104 can be a social networking application, such as is illustrated in FIG. 11, a peer-to-peer payment application, and so on. The same or similar techniques described above with respect to FIG. 10 can be applicable to such additional or alternative examples.

FIG. 11, for example, illustrates an example GUI 1100 for presenting a recommendation generated and/or otherwise provided by a fulfillment service provider, in association with a social networking application. For example, a user can post content (e.g., an image, a written statement, etc.), check-in at a location, comment on a post of another user, engage in a conversation with another user, participate in a peer-to-peer transaction or other interaction, and so on via the social networking application. The fulfillment module 108 can determine context information, which can include, but is not limited to a location associated with the check-in 1102, the subject matter of the content, the comment, conversation, transaction or other interaction, and the like. The recommendation module 126 can generate one or more recommendations 1104, which can be presented via the GUI 1100.

Figure 12:
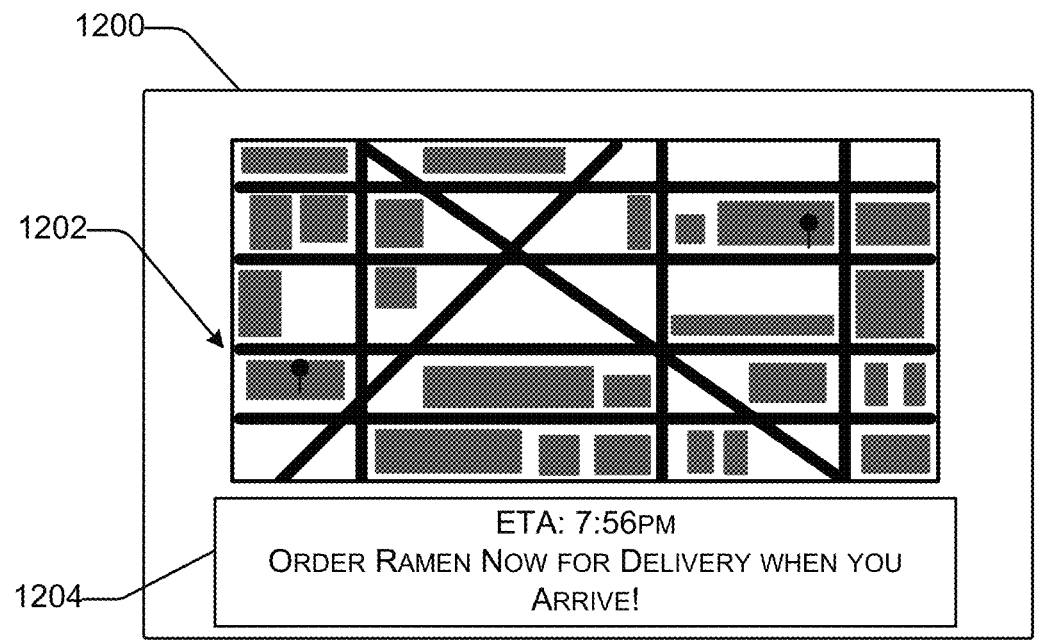
FIG. 12 illustrates an example GUI for presenting a recommendation generated and/or otherwise provided by a fulfillment service provider, as described herein.

FIG. 12 illustrates an example GUI 1200 for presenting a recommendation generated and/or otherwise provided by a fulfillment service provider. In at least one example, the GUI 1200 can be presented via the third-party application 104 (e.g., a user interface associated therewith). In FIG. 12 the third-party application 104 can be associated with a transportation network enabling peer-to-peer ridesharing, ride service hailing (e.g., via a manual or autonomous vehicle), etc. In at least one example, a user can use the third-party application 104 to hail a ride from a first location (e.g., a pick-up location) to a second location (e.g., a drop-off location). A driver, which can be a human or a computing system operable to provide commands for directing a vehicle along a route (e.g., an autonomous vehicle), can drive along a route between the first location to the second location. In at least one example, the third-party application 104 can present, via the GUI 1200, a map or other representation for the user to observe his or her progress along the route and/or other aspects of the ride.

In at least one example, the fulfillment module 108 can detect that the fulfillment service provider has been initialized based at least in part on an indication of an interaction between the user and the third-party application 104. Accordingly, the fulfillment module 108 can determine context information associated with the interaction between the user and the third-party application 104. In at least one example, the fulfillment module 108 can determine context information based at least in part on the route between the first location and the second location. For instance, the fulfillment module 108 can receive indications of the first location, the second location, a route along which the driver intends to drive, and so on. The fulfillment module 108 can determine context information based on such indications. In some examples, the third-party application 104 can provide near-real-time updates to the fulfillment module 108. In at least one example, the fulfillment module 108 can track the interaction between the user and the transportation application, e.g., through an API 116, to synchronize events, such as ordering, delivery, and the like, with how far the user is from their destination. For example, the events initialized by the fulfillment service provider can tied to state, e.g., tracked via a state machine, of the events initialized by the transportation application (e.g., indications of the first location, the second location, a route along which the driver intends to drive, the near-real-time updates, etc. to determine an estimated time of arrival at the second location, for instance).

The recommendation module 126 can generate one or more recommendations 1204 that can be surfaced via the third-party application 104 (e.g., a user interface associated therewith). For example, the recommendation module 126 can analyze the context information to determine one or more recommendations 1204 for the user. In at least one example, the recommendation module 126 can utilize a machine-trained model to generate the one or more recommendations 1204. The one or more recommendations 1204 can include a recommendation for a service available via a fulfillment service provider, a recommendation for a merchant associated with the fulfillment service provider, a recommendation for an item associated with the fulfillment service provider, and so on. In at least one example, the recommendation(s) 1204 can be context-dependent such that the service(s), merchant(s), and/or item(s) depend on the context information associated with initialization of the fulfillment service provider.

As illustrated in FIG. 12, the one or more recommendations 1204 can include a recommendation to place an order that can be scheduled to arrive at or near the same time that the user arrives at the second location. In at least one example, the merchant and/or item(s) recommended can be selected by the recommendation module 126 based on location, the arrival time, etc. Further, in some examples, the merchant and/or item(s) recommended can be selected based on previous transaction data associated with the user, identified user preferences, etc. Alternatively, the recommendation module 126 can generate a recommendation to place an order at a merchant along the route and the recommendation module 126 and the third-party application 104 can communicate such that the driver can stop at the merchant to enable the user to pick up the order.

In at least one example, a user can interact with the recommendation(s) 1204 to place the order. For instance, the recommendation(s) 1204 can be associated with a mechanism that, when actuated, enables the user to order the ramen. Responsive to the user actuating the mechanism, the fulfillment module 108 can receive an order for the ramen. The fulfillment module 108 can facilitate fulfillment of the order. For example, the fulfillment module 108 can send an instruction to one or more merchants that can fulfill and, in some examples, deliver the ramen. The merchant(s) can receive the instruction and can fulfill the order, and in some examples, deliver the order. In some examples, the merchant(s) can provide a confirmation of the instruction, an estimated time for delivery, etc.

In some examples, the third-party application 104 can facilitate capturing payment information of the user for settling the cost of the service(s) and/or item(s) ordered by the user. In other examples, the fulfillment module 108 can request and receive payment information of the user (e.g., via a secure payment mechanism) for settling the cost of the service(s) and/or item(s) ordered by the user. Which entity (e.g., the third-party application 104 or the fulfillment service provider) captures payment information for settling the transaction is a designation that can be programmed by a developer associated with the third-party application 104.

Figure 13:
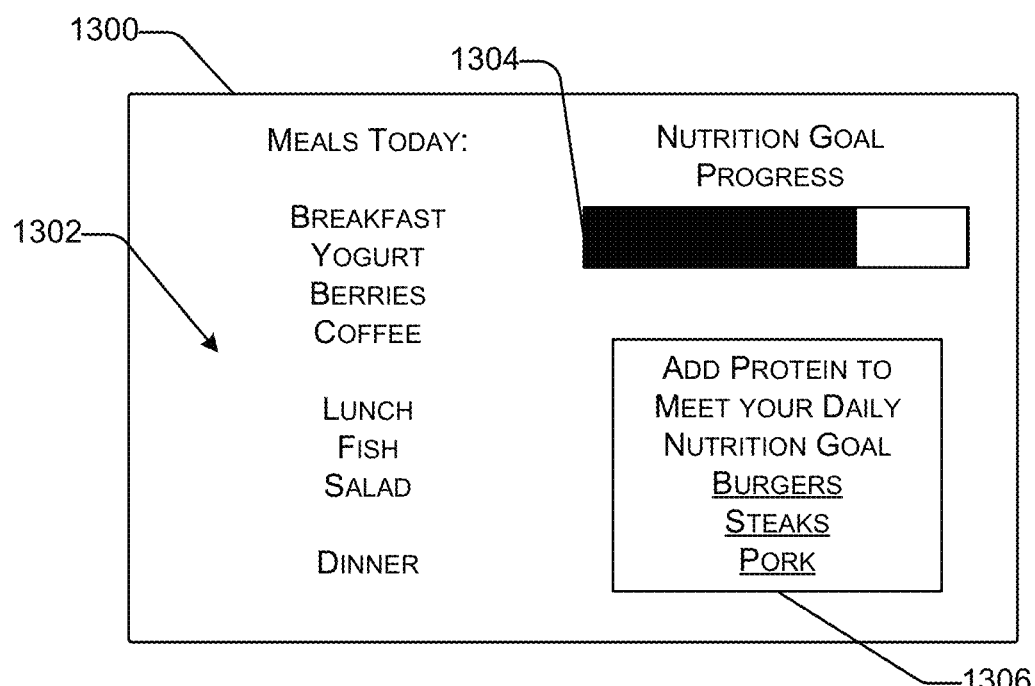
FIG. 13 illustrates an example GUI for presenting a recommendation generated and/or otherwise provided by a fulfillment service provider, as described herein.

FIG. 13 illustrates an example GUI 1300 for presenting a recommendation generated and/or otherwise provided by a fulfillment service provider. In at least one example, the GUI 1300 can be presented via the third-party application 104 (e.g., a user interface associated therewith). In FIG. 13 the third-party application 104 can be associated with a service provider that provides nutrition planning and/or tracking, or more generally health or fitness tracking applications. As illustrated in FIG. 13, the third-party application 104 can present a listing 1302 of food consumed by a user on a particular day. In at least one example, the user may have previously input nutrition goals (or default nutrition goals can be used). The third-party application 104 can present a user interface element 1304 that visually represents progress of the user in achieving the nutrition goals.

In at least one example, the fulfillment module 108 can detect that the fulfillment service provider has been initialized based at least in part on an indication of an interaction between the user and the third-party application 104. Accordingly, the fulfillment module 108 can determine context information associated with the interaction between the user and the third-party application 104. In at least one example, the fulfillment module 108 can determine context information based at least in part on the listing 1302 of food consumed by a user on a particular day and/or the progress of the user in achieving his or her nutrition goals (as represented by the user interface element 1304). For instance, the fulfillment module 108 can utilize NLP techniques to determine what food the user has consumed and/or nutrition goals of the user. Further, context information can include a location of the user, a date, a time of day, and so on.

The recommendation module 126 can generate one or more recommendations 1306 that can be surfaced via the third-party application 104 (e.g., a user interface associated therewith). For example, the recommendation module 126 can analyze the context information to determine one or more recommendations 1306 for the user. In at least one example, the recommendation module 126 can utilize a machine-trained model to generate the one or more recommendations 1306. The one or more recommendations 1306 can include a recommendation for a service available via a fulfillment service provider, a recommendation for a merchant associated with the fulfillment service provider, a recommendation for an item associated with the fulfillment service provider, and so on. In at least one example, the recommendation(s) 1306 can be context-dependent such that the service(s), merchant(s), and/or item(s) depend on the context information associated with initialization of the fulfillment service provider.

As illustrated in FIG. 13, the one or more recommendations 1306 can include a recommendation for food items that can assist the user in achieving their nutrition goals. That is, the one or more recommendations 1306 can include a recommendation for food items that can assist the user in achieving their nutrition goals, which can be based on the listing 1302 of food consumed by the user on the particular day. In at least one example, a user can interact with the recommendation(s) 1306 to order a food item having protein, as recommended by the fulfillment module 108. For instance, the recommendation(s) 1306 can be associated with at least one mechanism that, when actuated, enables the user to order a food item having protein. Responsive to the user actuating the mechanism, the fulfillment module 108 can receive such an order. The fulfillment module 108 can facilitate fulfillment of the order. For example, the fulfillment module 108 can send an instruction to one or more merchants that can fulfill and, in some examples, deliver the order for the user. The merchant(s) can receive the instruction and can fulfill the order, and in some examples, deliver the order. In some examples, the merchant(s) can provide a confirmation of the instruction, an estimated time for delivery, etc.

In some examples, the third-party application 104 can facilitate capturing payment information of the user for settling the cost of the service(s) and/or item(s) ordered by the user. In other examples, the fulfillment module 108 can request and receive payment information of the user (e.g., via a secure payment mechanism) for settling the cost of the service(s) and/or item(s) ordered by the user. Which entity (e.g., the third-party application 104 or the fulfillment service provider) captures payment information for settling the transaction is a designation that can be programmed by a developer associated with the third-party application 104.

FIGS. 7-13 are directed to various example GUIs. Each figure illustrates an example of how the fulfillment service provider can be integrated into a third-party application. The content and recommendations are merely illustrative and should not be considered to be limiting. Additional and/or alternative content and/or recommendations can be presented via the GUIs, using techniques described herein.

Figure 14:
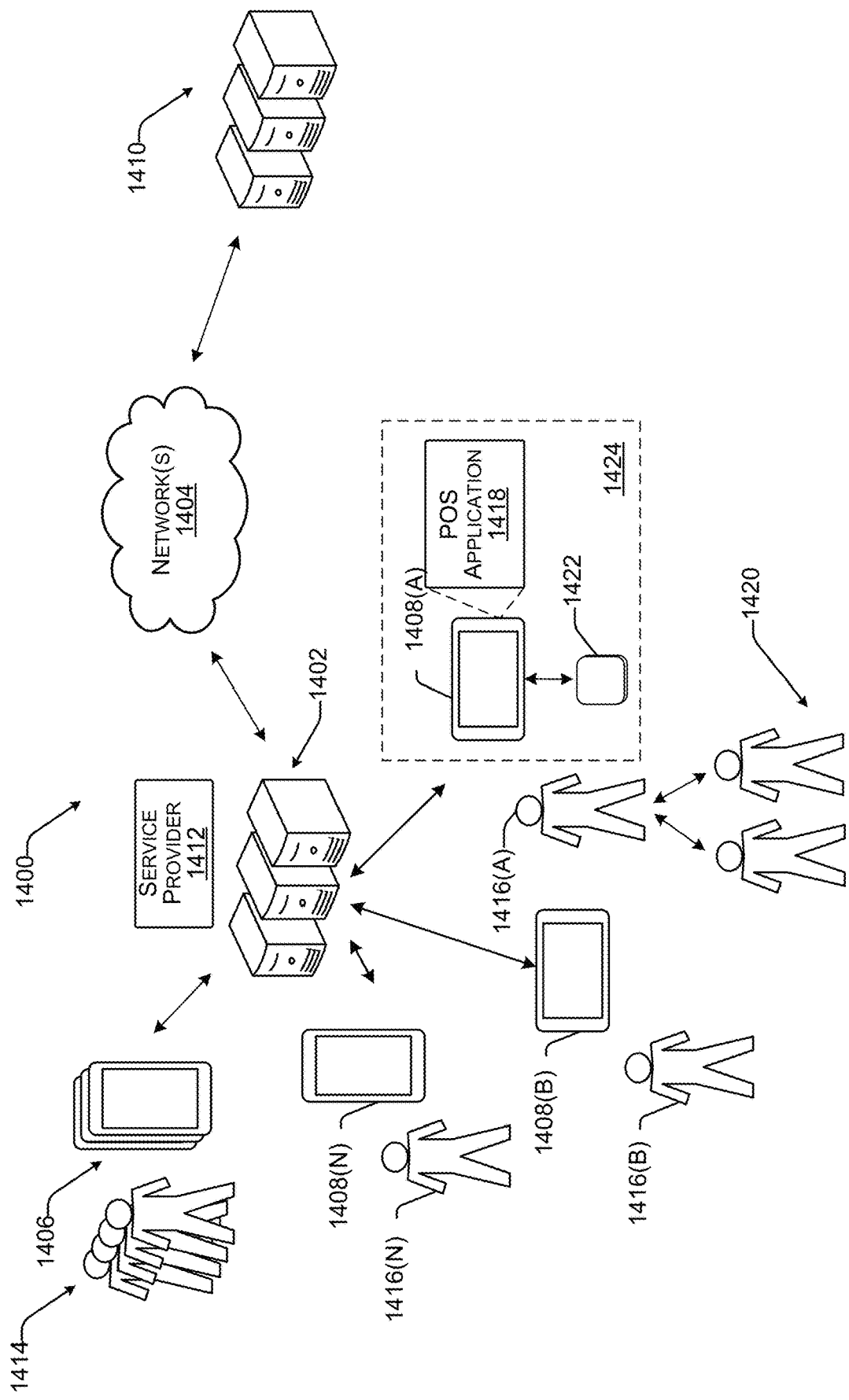
FIG. 14 illustrates an example merchant ecosystem for facilitating, among other things, techniques described herein, as described herein.

FIG. 14 illustrates an example environment 1400. The environment 1400 includes server computing device(s) 1402 that can communicate over a network 1404 with user devices 1406 (which, in some examples can be merchant devices 1408 (individually, 1408(A)-1408(N))) and/or server computing device(s) 1410 associated with third-party service provider(s). The server computing device(s) 1402 can be associated with a service provider 1412 that can provide one or more services for the benefit of users 1414, as described below. Actions attributed to the service provider 1412 can be performed by the server computing device(s) 1402.

The environment 1400 can include a plurality of user devices 1406, as described above. Each one of the plurality of user devices 1406 can be any type of computing device such as a tablet computing device, a smart phone or mobile communication device, a laptop, a netbook or other portable computer or semi-portable computer, a desktop computing device, a terminal computing device or other semi-stationary or stationary computing device, a dedicated device, a wearable computing device or other body-mounted computing device, an augmented reality device, a virtual reality device, an Internet of Things (IoT) device, etc. In some examples, individual ones of the user devices can be operable by users 1414. The users 1414 can be referred to as customers, buyers, merchants, sellers, borrowers, employees, employers, payor, payee, and so on. The users 1414 can interact with the user devices 1406 via user interfaces presented via the user devices 1406. In at least one example, a user interface can be presented via a web browser, or the like. In other examples, a user interface can be presented via an application, such as a mobile application or desktop application, which can be provided by the service provider 1412 or which can be an otherwise dedicated application. In at least one example, a user 1414 can interact with the user interface via touch input, spoken input, or any other type of input.

As described above, in at least one example, the users 1414 can include merchants 1415 (individually, 1415(A)-1415(N)). In an example, the merchants 1415 can operate respective merchant devices 1408, which can be user devices 1406 configured for use by merchants 1415. For the purpose of this discussion, a "merchant" can be any entity that offers items (e.g., goods or services) for purchase or other means of acquisition (e.g., rent, borrow, barter, etc.). The merchants 1415 can offer items for purchase or other means of acquisition via brick-and-mortar stores, mobile stores (e.g., pop-up shops, food trucks, etc.), online stores, combinations of the foregoing, and so forth. In some examples, at least some of the merchants 1415 can be associated with a same entity but can have different merchant locations and/or can have franchise/franchisee relationships. In additional or alternative examples, the merchants 1415 can be different merchants. That is, in at least one example, the merchant 1415(A) is a different merchant than the merchant 1415(B) and/or the merchant 1415(C).

For the purpose of this discussion, "different merchants" can refer to two or more unrelated merchants. "Different merchants" therefore can refer to two or more merchants that are different legal entities that do not share accounting, employees, branding, etc. "Different merchants," as used herein, have different names, employer identification numbers (EIN)s, lines of business (in some examples), inventories (or at least portions thereof), and/or the like. That is, the use of the term "different merchants" does not refer to a merchant with various merchant locations or franchise/franchisee relationships.

Each merchant device 1408 can have an instance of a POS application 1418 stored thereon. The POS application 1418 can configure the merchant device 1408 as a POS terminal, which enables the merchant 1415(A) to interact with one or more customers 1420. As described above, the users 1414 can include customers, such as the customers 1420 shown as interacting with the merchant 1415(A). For the purpose of this discussion, a "customer" can be any entity that acquires items from merchants. While only two customers 1420 are illustrated in FIG. 14, any number of customers 1420 can interact with the merchants 1415. Further, while FIG. 14 illustrates the customers 1420 interacting with the merchant 1415(A), the customers 1420 can interact with any of the merchants 1415.

In at least one example, interactions between the customers 1420 and the merchants 1415 that involve the exchange of funds (from the customers 1420) for items (from the merchants 1415) can be referred to as "POS transactions" and/or "transactions." In at least one example, the POS application 1418 can determine transaction data associated with the POS transactions. Transaction data can include payment information, which can be obtained from a reader device 1422 associated with the merchant device 1408(A), user authentication data, purchase amount information, point-of-purchase information (e.g., item(s) purchased, date of purchase, time of purchase, etc.), etc. The POS application 1418 can send transaction data to the server computing device(s) 1402. Furthermore, the POS application 1418 can present a UI to enable the merchant 1415(A) to interact with the POS application 1418 and/or the service provider 1412 via the POS application 1418.

In at least one example, the merchant device 1408(A) can be a special-purpose computing device configured as a POS terminal (via the execution of the POS application 1418). In at least one example, the POS terminal may be connected to a reader device 1422, which is capable of accepting a variety of payment instruments, such as credit cards, debit cards, gift cards, short-range communication based payment instruments, and the like, as described below. In some examples, the reader device 1422 can read information from alternative payment instruments including, but not limited to, wristbands and the like.

The POS terminal can be paired with a reader device 1422 to comprise a POS system 1424. The reader device 1422 may physically interact with payment instruments such as magnetic stripe payment cards, EMV payment cards, and/or short-range communication (e.g., near field communication (NFC), radio frequency identification (RFID), Bluetooth®, Bluetooth® low energy (BLE), etc.) payment instruments. The POS terminal may provide a rich user interface, communicate with the reader device 1422, and communicate with the server computing device(s) 1402, which can provide, among other services, a payment processing service. The service provider 1412 can communicate with server computing device(s) 1410, as described below. In this manner, the POS terminal and reader device 1422 may collectively process transaction(s) between the merchants 1415 and customers 1420. In some examples, POS terminals and reader devices can be configured in one-to-one pairings. In other examples, the POS terminals and reader devices can be configured in many-to-one pairings (e.g., one POS terminal coupled to multiple reader devices or multiple POS terminals coupled to one reader device).

While, the POS terminal and the reader device 1422 of the POS system 1424 are shown as separate devices, in additional or alternative examples, the POS terminal and the reader device 1422 can be part of a single device. In some examples, the reader device 1422 can have a display integrated therein for presenting information to the customers 1420. In additional or alternative examples, the POS terminal can have a display integrated therein for presenting information to the customers 1420. POS systems, such as the POS system 1424, may be mobile, such that POS terminals and reader devices may process transactions in disparate locations across the world. POS systems can be used for processing card-present transactions and card-not-present (CNP) transactions, as described below.

A card-present transaction is a transaction where both a customer 1420 and his or her payment instrument are physically present at the time of the transaction. Card-present transactions may be processed by swipes, dips, taps, or any other interaction between a physical payment instrument (e.g., a card) and a reader device 1422 whereby the reader device 1422 is able to obtain payment data from the payment instrument. A swipe is a card-present transaction where a customer 1420 slides a card, or other payment instrument, having a magnetic strip through a reader device 1422 that captures payment data contained in the magnetic strip. A dip is a card-present transaction where a customer 1420 inserts a payment instrument having an embedded microchip (i.e., chip) into a reader device 1422 first. The dipped payment instrument remains in the payment reader until the reader device 1422 prompts the customer 1420 to remove the card, or other payment instrument. While the payment instrument is in the reader device 1422, the microchip can create a one-time code which is sent from the POS system 1424 to the server computing device(s) 1410 (which can be associated with third-party service providers that provide payment services, including but not limited to, an acquirer bank, an issuer, and/or a card payment network (e.g., Mastercard®, VISA®, etc.)) to be matched with an identical one-time code. A tap is a card-present transaction where a customer 1420 may tap or hover his or her payment instrument (e.g., card, electronic device such as a smart phone running a payment application, etc.) over a reader device 1422 to complete a transaction via short-range communication (e.g., NFC, RFID, Bluetooth®, BLE, etc.). Short-range communication enables the payment instrument to exchange information with the reader device 1422. A tap may also be called a contactless payment.

A CNP transaction is a transaction where a card, or other payment instrument, are not physically present at the POS such that payment data is required to be manually keyed in (e.g., by a merchant, customer, etc.), or payment data is required to be recalled from a card-on-file data store, to complete the transaction.

The POS system 1424, the server computing device(s) 1402, and/or the server computing device(s) 1410 may exchange payment information and transaction data to determine whether transactions are authorized. For example, the POS system 1424 may provide encrypted payment data, user authentication data, purchase amount information, point-of-purchase information, etc. (collectively, transaction data) to server computing device(s) 1402 over the network(s) 1404. The server computing device(s) 1402 may send the transaction data to the server computing device(s) 1410. As described above, in at least one example, the server computing device(s) 1410 can be associated with third-party service providers that provide payment services, including but not limited to, an acquirer bank, an issuer, and/or a card payment network (e.g., Mastercard®, VISA®, etc.)

For the purpose of this discussion, the "payment service providers" can be acquiring banks ("acquirer"), issuing banks ("issuer"), card payment networks, and the like. In an example, an acquirer is a bank or financial institution that processes payments (e.g., credit or debit card payments) and can assume risk on behalf of merchants(s). An acquirer can be a registered member of a card association (e.g., Visa®, MasterCard®), and can be part of a card payment network. The acquirer (e.g., the server computing device(s) 1410 associated therewith) can send a fund transfer request to a server computing device of a card payment network (e.g., Mastercard®, VISA®, etc.) to determine whether the transaction is authorized or deficient. In at least one example, the service provider 1412 can serve as an acquirer and connect directly with the card payment network.

The card payment network (e.g., the server computing device(s) 1410 associated therewith) can forward the fund transfer request to an issuing bank (e.g., "issuer"). The issuer is a bank or financial institution that offers a financial account (e.g., credit or debit card account) to a user. An issuer can issue payment cards to users and can pay acquirers for purchases made by cardholders to which the issuing bank has issued a payment card. The issuer (e.g., the server computing device(s) 1410 associated therewith) can make a determination as to whether the customer has the capacity to absorb the relevant charge associated with the payment transaction. In at least one example, the service provider 1412 can serve as an issuer and/or can partner with an issuer. The transaction is either approved or rejected by the issuer and/or the card payment network (e.g., the server computing device(s) 1410 associated therewith), and a payment authorization message is communicated from the issuer to the POS device via a path opposite of that described above, or via an alternate path.

As described above, the server computing device(s) 1410, which can be associated with payment service provider(s), may determine whether the transaction is authorized based on the transaction data, as well as information relating to parties to the transaction (e.g., the customer 1420 and/or the merchant 1415(A)). The server computing device(s) 1410 may send an authorization notification over the network(s) 1404 to the server computing device(s) 1402, which may send the authorization notification to the POS system 1424 over the network(s) 1404 to indicate whether the transaction is authorized. The server computing device(s) 1402 may also transmit additional information such as transaction identifiers to the POS system 1424. In one example, the server computing device(s) 1402 may include a merchant application and/or other functional components for communicating with the POS system 1424 and/or the server computing device(s) 1410 to authorize or decline transactions.

Based on the authentication notification that is received by the POS system 1424 from server computing device(s) 1410, the merchant 1415(A) may indicate to the customer 1420 whether the transaction has been approved. In some examples, approval may be indicated at the POS system 1424, for example, at a display of the POS system 1424. In other examples, such as with a smart phone or watch operating as a short-range communication payment instrument, information about the approved transaction may be provided to the short-range communication payment instrument for presentation via a display of the smart phone or watch. In some examples, additional or alternative information can additionally be presented with the approved transaction notification including, but not limited to, receipts, special offers, coupons, or loyalty program information.

As mentioned above, the service provider 1412 can provide, among other services, payment processing services, inventory management services, catalog management services, business banking services, financing services, web-development services, payroll services, employee management services, appointment services, restaurant management services, order management services, delivery services, peer-to-peer payment services, onboarding services, identity verification (IDV) services, and so on. In some examples, the users 1414 can access all of the services of the service provider 1412. In other examples, the users 1414 can have gradated access to the services, which can be based on risk tolerance, IDV outputs, subscriptions, and so on. In at least one example, access to such services can be availed to the merchants 1415 via the POS application 1418. In additional or alternative examples, each service can be associated with its own access point (e.g., application, web browser, etc.).

The service provider 1412 can offer payment processing services for processing payments on behalf of the merchants 1415, as described above. For example, the service provider 1412 can provision payment processing software, payment processing hardware and/or payment processing services to merchants 1415, as described above, to enable the merchants 1415 to receive payments from the customers 1420 when conducting POS transactions with the customers 1420. For instance, the service provider 1412 can enable the merchants 1415 to receive cash payments, payment card payments, and/or electronic payments from customers 1420 for POS transactions and the service provider 1412 can process transactions on behalf of the merchants 1415.

As the service provider 1412 processes transactions on behalf of the merchants 1415, the service provider 1412 can maintain accounts or balances for the merchants 1415 in one or more ledgers. For example, the service provider 1412 can analyze transaction data received for a transaction to determine an amount of funds owed to a merchant 1415(A) for the transaction. In at least one example, such an amount can be a total purchase price less fees charged by the service provider 1412 for providing the payment processing services. Based on determining the amount of funds owed to the merchant 1415(A), the service provider 1412 can deposit funds into an account of the merchant 1415(A). The account can have a stored balance, which can be managed by the service provider 1412. The account can be different from a conventional bank account at least because the stored balance is managed by a ledger of the service provider 1412 and the associated funds are accessible via various withdrawal channels including, but not limited to, scheduled deposit, same-day deposit, instant deposit, and a linked payment instrument.

A scheduled deposit can occur when the service provider 1412 transfers funds associated with a stored balance of the merchant 1415(A) to a bank account of the merchant 1415(A) that is held at a bank or other financial institution (e.g., associated with the server computing device(s) 1410). Scheduled deposits can occur at a prearranged time after a POS transaction is funded, which can be a business day after the POS transaction occurred, or sooner or later. In some examples, the merchant 1415(A) can access funds prior to a scheduled deposit. For instance, the merchant 1415(A) may have access to same-day deposits (e.g., wherein the service provider 1412 deposits funds from the stored balance to a linked bank account of the merchant on a same day as POS transaction, in some examples prior to the POS transaction being funded) or instant deposits (e.g., wherein the service provider 1412 deposits funds from the stored balance to a linked bank account of the merchant on demand, such as responsive to a request). Further, in at least one example, the merchant 1415(A) can have a payment instrument that is linked to the stored balance that enables the merchant to access the funds without first transferring the funds from the account managed by the service provider 1412 to the bank account of the merchant 1415(A).

In at least one example, the service provider 1412 may provide inventory management services. That is, the service provider 1412 may provide inventory tracking and reporting. Inventory management services may enable the merchant 1415(A) to access and manage a database storing data associated with a quantity of each item that the merchant 1415(A) has available (i.e., an inventory). Furthermore, in at least one example, the service provider 1412 can provide catalog management services to enable the merchant 1415(A) to maintain a catalog, which can be a database storing data associated with items that the merchant 1415(A) has available for acquisition (i.e., catalog management services). In at least one example, the catalog may include a plurality of data items and a data item of the plurality of data items may represent an item that the merchant 1461(A) has available for acquisition.

In at least one example, the service provider 1412 can provide business banking services, which allow the merchant 1415(A) to track deposits (from payment processing and/or other sources of funds) into an account of the merchant 1415(A), payroll payments from the account (e.g., payments to employees of the merchant 1415(A)), payments to other merchants (e.g., business-to-business) directly from the account or from a linked debit card, withdrawals made via scheduled deposit and/or instant deposit, etc. Furthermore, the business banking services can enable the merchant 1415(A) to check how much money they are earning (e.g., via presentation of available earned balance), understand where their money is going (e.g., via deposit reports (which can include a breakdown of fees), spend reports, etc.), access/use earned money (e.g., via scheduled deposit, instant deposit, linked payment instrument, etc.), feel in control of their money (e.g., via management of deposit schedule, deposit speed, linked instruments, etc.), etc. Moreover, the business banking services can enable the merchants 1415 to visualize their cash flow to track their financial health, set aside money for upcoming obligations (e.g., savings), organize money around goals, etc.

In at least one example, the service provider 1412 can provide financing services and products, such as via business loans, consumer loans, fixed term loans, flexible term loans, and the like. In at least one example, the service provider 1412 can utilize one or more risk signals to determine whether to extend financing offers and/or terms associated with such financing offers.

In at least one example, the service provider 1412 can provide financing services for offering and/or lending a loan to a borrower that is to be used for, in some instances, financing the borrower's short-term operational needs (e.g., a capital loan). For instance, a potential borrower that is a merchant can obtain a capital loan via a capital loan product in order to finance various operational costs (e.g., rent, payroll, inventory, etc.). In at least one example, the service provider 1412 can offer different types of capital loan products. For instance, in at least one example, the service provider 1412 can offer a daily repayment loan product, wherein a capital loan is repaid daily, for instance, from a portion of transactions processed by the payment processing service on behalf of the borrower. Additionally and/or alternatively, the service provider 1412 can offer a monthly repayment loan product, wherein a capital loan is repaid monthly, for instance, via a debit from a bank account linked to the payment processing service.

Additionally or alternatively, the service provider 1412 can provide financing services for offering and/or lending a loan to a borrower that is to be used for, in some instances, financing the borrower's consumer purchase (e.g., a consumer loan). In at least one example, a borrower can submit a request for a loan to enable the borrower to purchase an item from a merchant, which can be one of the merchants 1415. The service provider 1412 can generate the loan based at least in part on determining that the borrower purchased or intends to purchase the item from the merchant. The loan can be associated with a balance based on an actual purchase price of the item and the borrower can repay the loan overtime. In some examples, the borrower can repay the loan via installments, which can be paid via a stored balance associated with the service provider 1412. The service provider 1412 can offer specific financial products, such as payment instruments, tied specifically to the loan products. For example, in one implementation, the server provider 1412 associate capital to a merchant or customer's debit card, where the use of the debit card is defined by the terms of the loan. In some examples, the merchant may only use the debit card for making specific purchases. In other examples, the "installment" associated with the loan product is credited directly via the payment instrument. The payment instrument is thus customized to the loan and/or the parties associated with the loan.

The service provider 1412 can provide web-development services, which enable users 1414 who are unfamiliar with HTML, XML, Javascript, CSS, or other web design tools to create and maintain professional and aesthetically pleasing websites. Some of these web page editing applications allow users to build a web page and/or modify a web page (e.g., change, add, or remove content associated with a web page). Further, in addition to web sites, the web-development services can create and maintain other online omni-channel presence, such as social media posts for example.

Furthermore, the service provider 1412 can provide payroll services to enable employers to pay employees for work performed on behalf of employers. In at least one example, the service provider 1412 can receive data that includes time worked by an employee, sales made by the employee, gratuities received by the employee, and so forth. Based on such data, the service provider 1412 can make payroll payments to employee(s) on behalf of an employer via the payroll service. For instance, the service provider 1412 can facilitate the transfer of a total amount to be paid out for the payroll of an employee from the bank of the employer to the bank of the service provider 1412 to be used to make payroll payments. In at least one example, when the funds have been received at the bank of the service provider 1412, the service provider 1412 can pay the employee, such as by check or direct deposit, often a day, a week, or more after when the work was actually performed by the employee. In additional or alternative examples, the service provider 1412 can enable employee(s) to receive payments via same-day or instant deposit based at least in part on risk and/or reliability analyses performed by the service provider 1412.

Moreover, in at least one example, the service provider 1412 can provide employee management services for managing schedules of employees. Further, the service provider 1412 can provide appointment services for enabling users 1414 to set schedules for scheduling appointments and/or users 1414 to schedule appointments.

In some examples, the service provider 1412 can provide restaurant management services to enable users 1414 to make and/or manage reservations, to monitor front-of-house and/or back-of-house operations, and so on. In at least one example, the service provider 1412 can provide order management services and/or delivery services to enable restaurants to manage open tickets, split tickets, and so on and/or manage delivery services. In some examples, such services can be associated with restaurant merchants, as described above. In additional or alternative examples, such services can be any type of merchant.

In at least one example, the service provider 1412 can provide a peer-to-peer payment service that enables peer-to-peer payments between two or more users 1414. In at least one example, the service provider 1412 can communicate with instances of a payment application (or other access point) installed on devices 1406 configured for operation by users 1414. In an example, an instance of the payment application executing on a first device operated by a payor can send a request to the service provider 1412 to transfer an amount of funds (e.g., fiat currency or non-fiat currency such as cryptocurrency, securities, and related assets) from an account of the payor to an account of a payee (e.g., a peer-to-peer payment). The service provider 1412 can facilitate the transfer and can send a notification to an instance of the payment application executing on a second mobile device operated by the payee that the transfer is in process (or has been completed). In some examples, the service provider 1412 can send additional or alternative information to the instances of the payment application (e.g., low balance to the payor, current balance to the payor or the payee, etc.). In some examples, the payor can transfer funds to the payee unprompted. In other examples, the payee can send a request for funds to the payor prior to the payor initiating the transfer of funds. The funds transferred can be associated with any digital currency type, including, but not limited to, cash, cryptocurrency, etc.

In at least one example, a user 1414 may be new to the service provider 1412 such that the user 1414 that has not registered (e.g., subscribed to receive access to one or more services offered by the service provider) with the service provider 1412. The service provider 1412 can offer onboarding services for registering a potential user 1414 with the service provider 1412. In some examples, onboarding can involve presenting various questions, prompts, and the like to a potential user 1414 to obtain information that can be used to generate a profile for the potential user 1414. Responsive to the potential user 1414 providing all necessary information, the potential user 1414 can be onboarded to the service provider 1412.

The service provider 1412 can be associated with IDV services, which can be used by the service provider 1412 for compliance purposes and/or can be offered as a service, for instance to third-party service providers (e.g., associated with the server computing device(s) 1410). That is, the service provider 1412 can offer IDV services to verify the identity of users 1414 seeking to use or using their services. Identity verification requires a customer (or potential customer) to provide information that is used by compliance departments to prove that the information is associated with an identity of a real person or entity. In at least one example, the service provider 1412 can perform services for determining whether identifying information provided by a user 1414 accurately identifies the customer (or potential customer) (i.e., Is the customer who they say they are?).

The service provider 1412 is capable of providing additional or alternative services and the services described above are offered as a sampling of services. In at least one example, the service provider 1412 can exchange data with the server computing device(s) 1410 associated with third-party service providers. Such third-party service providers can provide information that enables the service provider 1412 to provide services, such as those described above. In additional or alternative examples, such third-party service providers can access services of the service provider 1412. That is, in some examples, the third-party service providers can be subscribers, or otherwise access, services of the service provider 1412.

Techniques described herein can be configured to operate in both real-time/online and offline modes. "Online" modes refer to modes when devices are capable of communicating with the service provider 1412 (e.g., the server computing device(s) 1402) and/or the server computing device(s) 1410 via the network(s) 1404. In some examples, the merchant device(s) 1408 are not capable of connecting with the service provider 1412 (e.g., the server computing device(s) 1402) and/or the server computing device(s) 1410, due to a network connectivity issue, for example. In additional or alternative examples, the server computing device(s) 1402 are not capable of communicating with the server computing device(s) 1410 due to network connectivity issue, for example. In such examples, devices may operate in "offline" mode where at least some payment data is stored (e.g., on the merchant device(s) 1408) and/or the server computing device(s) 1402 until connectivity is restored and the payment data can be transmitted to the server computing device(s) 1402 and/or the server computing device(s) 1410 for processing.

Figure 15:
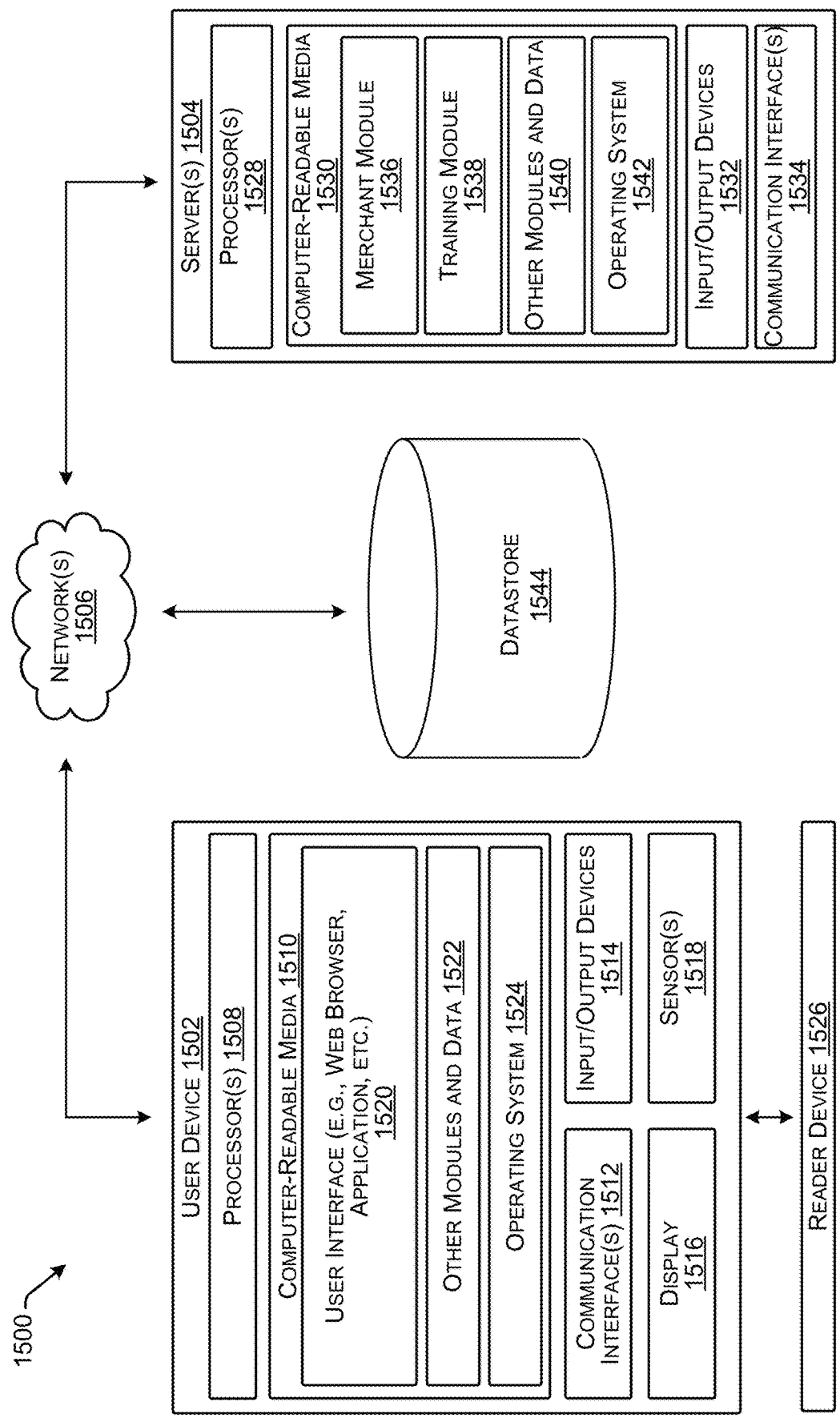
FIG. 15 illustrates additional details associated with individual components of the merchant ecosystem described above in FIG. 14.

FIG. 15 depicts an illustrative block diagram illustrating a system 1500 for performing techniques described herein. The system 1500 includes a user device 1502, that communicates with server computing device(s) (e.g., server(s) 1504) via network(s) 1506 (e.g., the Internet, cable network(s), cellular network(s), cloud network(s), wireless network(s) (e.g., Wi-Fi) and wired network(s), as well as close-range communications such as Bluetooth®, Bluetooth® low energy (BLE), and the like). While a single user device 1502 is illustrated, in additional or alternate examples, the system 1500 can have multiple user devices, as described above with reference to FIG. 14.

In at least one example, the user device 1502 can be any suitable type of computing device, e.g., portable, semi-portable, semi-stationary, or stationary. Some examples of the user device 1502 can include, but are not limited to, a tablet computing device, a smart phone or mobile communication device, a laptop, a netbook or other portable computer or semi-portable computer, a desktop computing device, a terminal computing device or other semi-stationary or stationary computing device, a dedicated device, a wearable computing device or other body-mounted computing device, an augmented reality device, a virtual reality device, an Internet of Things (IoT) device, etc. That is, the user device 1502 can be any computing device capable of sending communications and performing the functions according to the techniques described herein. The user device 1502 can include devices, e.g., payment card readers, or components capable of accepting payments, as described below.

In the illustrated example, the user device 1502 includes one or more processors 1508, one or more computer-readable media 1510, one or more communication interface(s) 1512, one or more input/output (I/O) devices 1514, a display 1516, and sensor(s) 1518.

In at least one example, each processor 1508 can itself comprise one or more processors or processing cores. For example, the processor(s) 1508 can be implemented as one or more microprocessors, microcomputers, microcontrollers, digital signal processors, central processing units, state machines, logic circuitries, and/or any devices that manipulate signals based on operational instructions. In some examples, the processor(s) 1508 can be one or more hardware processors and/or logic circuits of any suitable type specifically programmed or configured to execute the algorithms and processes described herein. The processor(s) 1508 can be configured to fetch and execute computer-readable processor-executable instructions stored in the computer-readable media 1510.

Depending on the configuration of the user device 1502, the computer-readable media 1510 can be an example of tangible non-transitory computer storage media and can include volatile and nonvolatile memory and/or removable and non-removable media implemented in any type of technology for storage of information such as computer-readable processor-executable instructions, data structures, program modules or other data. The computer-readable media 1510 can include, but is not limited to, RAM, ROM, EEPROM, flash memory, solid-state storage, magnetic disk storage, optical storage, and/or other computer-readable media technology. Further, in some examples, the user device 1502 can access external storage, such as RAID storage systems, storage arrays, network attached storage, storage area networks, cloud storage, or any other medium that can be used to store information and that can be accessed by the processor(s) 1508 directly or through another computing device or network. Accordingly, the computer-readable media 1510 can be computer storage media able to store instructions, modules or components that can be executed by the processor(s) 1508. Further, when mentioned, non-transitory computer-readable media exclude media such as energy, carrier signals, electromagnetic waves, and signals per se.

The computer-readable media 1510 can be used to store and maintain any number of functional components that are executable by the processor(s) 1508. In some implementations, these functional components comprise instructions or programs that are executable by the processor(s) 1508 and that, when executed, implement operational logic for performing the actions and services attributed above to the user device 1502. Functional components stored in the computer-readable media 1510 can include a user interface 1520 to enable users to interact with the user device 1502, and thus the server(s) 1504 and/or other networked devices. In at least one example, the user interface 1520 can be presented via a web browser, or the like. In other examples, the user interface 1520 can be presented via an application, such as a mobile application or desktop application, which can be provided by a service provider 1412 associated with the server(s) 1504, or which can be an otherwise dedicated application. The fulfillment user interface 114 and/or the integrated fulfillment user interface 124 are examples of the user interface 1520. In at least one example, a user can interact with the user interface via touch input, spoken input, gesture, or any other type of input. The word "input" is also used to describe "contextual" input that may not be directly provided by the user via the user interface 1520. For example, user's interactions with the user interface 1520 are analyzed using, e.g., natural language processing techniques, to determine context or intent of the user, which may be treated in a manner similar to "direct" user input.

Depending on the type of the user device 1502, the computer-readable media 1510 can also optionally include other functional components and data, such as other modules and data 1522, which can include programs, drivers, etc., and the data used or generated by the functional components. In addition, the computer-readable media 1510 can also store data, data structures and the like, that are used by the functional components. Further, the user device 1502 can include many other logical, programmatic and physical components, of which those described are merely examples that are related to the discussion herein.

In at least one example, the computer-readable media 1510 can include additional functional components, such as an operating system 1524 for controlling and managing various functions of the user device 1502 and for enabling basic user interactions.

The communication interface(s) 1512 can include one or more interfaces and hardware components for enabling communication with various other devices, such as over the network(s) 1506 or directly. For example, communication interface(s) 1512 can enable communication through one or more network(s) 1506, which can include, but are not limited any type of network known in the art, such as a local area network or a wide area network, such as the Internet, and can include a wireless network, such as a cellular network, a cloud network, a local wireless network, such as Wi-Fi and/or close-range wireless communications, such as Bluetooth®, BLE, NFC, RFID, a wired network, or any other such network, or any combination thereof. Accordingly, network(s) 1506 can include both wired and/or wireless communication technologies, including Bluetooth®, BLE, Wi-Fi and cellular communication technologies, as well as wired or fiber optic technologies. Components used for such communications can depend at least in part upon the type of network, the environment selected, or both. Protocols for communicating over such networks are well known and will not be discussed herein in detail.

Embodiments of the disclosure may be provided to users through a cloud computing infrastructure. Cloud computing refers to the provision of scalable computing resources as a service over a network, to enable convenient, on-demand network access to a shared pool of configurable computing resources that can be rapidly provisioned and released with minimal management effort or service provider interaction. Thus, cloud computing allows a user to access virtual computing resources (e.g., storage, data, applications, and even complete virtualized computing systems) in "the cloud," without regard for the underlying physical systems (or locations of those systems) used to provide the computing resources.

The user device 1502 can further include one or more input/output (I/O) devices 1514. The I/O devices 1514 can include speakers, a microphone, a camera, and various user controls (e.g., buttons, a joystick, a keyboard, a keypad, etc.), a haptic output device, and so forth. The I/O devices 1514 can also include attachments that leverage the accessories (audio-jack, USB-C, Bluetooth, etc.) to connect with the user device 1502.

In at least one example, user device 1502 can include a display 1516. Depending on the type of computing device(s) used as the user device 1502, the display 1516 can employ any suitable display technology. For example, the display 1516 can be a liquid crystal display, a plasma display, a light emitting diode display, an OLED (organic light-emitting diode) display, an electronic paper display, or any other suitable type of display able to present digital content thereon. In at least one example, the display 1516 can be an augmented reality display, a virtually reality display, or any other display able to present and/or project digital content. In some examples, the display 1516 can have a touch sensor associated with the display 1516 to provide a touchscreen display configured to receive touch inputs for enabling interaction with a graphic interface presented on the display 1516. Accordingly, implementations herein are not limited to any particular display technology. Alternatively, in some examples, the user device 1502 may not include the display 1516, and information can be presented by other means, such as aurally, haptically, etc.

In addition, the user device 1502 can include sensor(s) 1518. The sensor(s) 1518 can include a GPS device able to indicate location information. Further, the sensor(s) 1518 can include, but are not limited to, an accelerometer, gyroscope, compass, proximity sensor, camera, microphone, and/or a switch.

Additionally, the user device 1502 can include various other components that are not shown, examples of which include removable storage, a power source, such as a battery and power control unit, a barcode scanner, a printer, a cash drawer, and so forth.

In addition, in some examples, the user device 1502 can include, be connectable to, or otherwise be coupled to a reader device 1526, for reading payment instruments and/or identifiers associated with payment objects. In some examples, as described above, the reader device 1526 can plug in to a port in the user device 1502, such as a microphone/headphone port, a data port, or other suitable port. In additional or alternative examples, the reader device 1526 can be coupled to the user device 1502 via another wired or wireless connection, such as via a Bluetooth®, BLE, and so on. The reader device 1526 can include a read head for reading a magnetic strip of a payment card, and further can include encryption technology for encrypting the information read from the magnetic strip. Additionally or alternatively, the reader device 1526 can be an EMV payment reader, which in some examples, can be embedded in the user device 1502. Moreover, numerous other types of readers can be employed with the user device 1502 herein, depending on the type and configuration of the user device 1502.

The reader device 1526 may be a portable magnetic stripe card reader, optical scanner, smartcard (card with an embedded IC chip) reader (e.g., an EMV-compliant card reader or short-range communication-enabled reader), RFID reader, or the like, configured to detect and obtain data off any payment instrument. Accordingly, the reader device 1526 may include hardware implementation, such as slots, magnetic tracks, and rails with one or more sensors or electrical contacts to facilitate detection and acceptance of a payment instrument. That is, the reader device 1526 may include hardware implementations to enable the reader device 1526 to interact with a payment instrument via a swipe (i.e., a card-present transaction where a customer slides a card having a magnetic strip through a payment reader that captures payment data contained in the magnetic strip), a dip (i.e., a card-present transaction where a customer inserts a card having an embedded microchip (i.e., chip) into a payment reader first until the payment reader prompts the customer to remove the card), or a tap (i.e., a card-present transaction where a customer may tap or hover his or her electronic device such as a smart phone running a payment application over a payment reader to complete a transaction via short-range communication) to obtain payment data associated with a customer. Additionally or optionally, the reader device 1526 may also include a biometric sensor to receive and process biometric characteristics and process them as payment instruments, given that such biometric characteristics are registered with the payment service system 100 and connected to a financial account with a bank server.

The reader device 1526 may include processing unit(s), computer-readable media, a reader chip, a transaction chip, a timer, a clock, a network interface, a power supply, and so on. The processing unit(s) of the reader device 1526 may execute one or more modules and/or processes to cause the reader device 1526 to perform a variety of functions, as set forth above and explained in further detail in the following disclosure. In some examples, the processing unit(s) may include a central processing unit (CPU), a graphics processing unit (GPU), a CPU and a GPU, or processing units or components known in the art. Additionally, each of the processing unit(s) may possess its own local memory, which also may store program modules, program data, and/or one or more operating systems. Depending on the exact configuration and type of the reader device 1526, the computer-readable media may include volatile memory (such as RAM), non-volatile memory (such as ROM, flash memory, miniature hard drive, memory card, or the like), or some combination thereof. In at least one example, the computer-readable media of the reader device 1526 may include at least one module for performing various functions as described herein.

The reader chip may perform functionalities to control the operations and processing of the reader device 1526. That is, the reader chip may perform functionalities to control payment interfaces (e.g., a contactless interface, a contact interface, etc.), a wireless communication interface, a wired interface, a user interface (e.g., a signal condition device (FPGA)), etc. Additionally, the reader chip may perform functionality to control the timer, which may provide a timer signal indicating an amount of time that has lapsed following a particular event (e.g., an interaction, a power-down event, etc.). Moreover, the reader chip may perform functionality to control the clock 156, which may provide a clock signal indicating a time. Furthermore, the reader chip may perform functionality to control the network interface, which may interface with the network(s) 1506, as described below.

Additionally, the reader chip may perform functionality to control the power supply. The power supply may include one or more power supplies such as a physical connection to AC power or a battery. Power supply may include power conversion circuitry for converting AC power and generating a plurality of DC voltages for use by components of reader device 1526. When power supply includes a battery, the battery may be charged via a physical power connection, via inductive charging, or via any other suitable method.

The transaction chip may perform functionalities relating to processing of payment transactions, interfacing with payment instruments, cryptography, and other payment-specific functionality. That is, the transaction chip may access payment data associated with a payment instrument and may provide the payment data to a POS terminal, as described above. The payment data may include, but is not limited to, a name of the customer, an address of the customer, a type (e.g., credit, debit, etc.) of a payment instrument, a number associated with the payment instrument, a verification value (e.g., PIN Verification Key Indicator (PVKI), PIN Verification Value (PVV), Card Verification Value (CVV), Card Verification Code (CVC), etc.) associated with the payment instrument, an expiration data associated with the payment instrument, a primary account number (PAN) corresponding to the customer (which may or may not match the number associated with the payment instrument), restrictions on what types of charges/debts may be made, etc. Additionally, the transaction chip may encrypt the payment data upon receiving the payment data.

It should be understood that in some examples, the reader chip may have its own processing unit(s) and computer-readable media and/or the transaction chip may have its own processing unit(s) and computer-readable media. In other examples, the functionalities of reader chip and transaction chip may be embodied in a single chip or a plurality of chips, each including any suitable combination of processing units and computer-readable media to collectively perform the functionalities of reader chip and transaction chip as described herein.

While, the user device 1502, which can be a POS terminal, and the reader device 1526 are shown as separate devices, in additional or alternative examples, the user device 1502 and the reader device 1526 can be part of a single device, which may be a battery-operated device. In such an example, components of both the user device 1502 and the reader device 1526 may be associated with the single device. In some examples, the reader device 1526 can have a display integrated therewith, which can be in addition to (or as an alternative of) the display 1516 associated with the user device 1502.

The server(s) 1504 can include one or more servers or other types of computing devices that can be embodied in any number of ways. For example, in the example of a server, the modules, other functional components, and data can be implemented on a single server, a cluster of servers, a server farm or data center, a cloud-hosted computing service, a cloud-hosted storage service, and so forth, although other computer architectures can additionally or alternatively be used.

Further, while the figures illustrate the components and data of the server(s) 1504 as being present in a single location, these components and data can alternatively be distributed across different computing devices and different locations in any manner. Consequently, the functions can be implemented by one or more server computing devices, with the various functionality described above distributed in various ways across the different computing devices. Multiple server(s) 1504 can be located together or separately, and organized, for example, as virtual servers, server banks and/or server farms. The described functionality can be provided by the servers of a single merchant or enterprise, or can be provided by the servers and/or services of multiple different customers or enterprises.

In the illustrated example, the server(s) 1504 can include one or more processors 1528, one or more computer-readable media 1530, one or more I/O devices 1532, and one or more communication interfaces 1534. Each processor 1528 can be a single processing unit or a number of processing units, and can include single or multiple computing units or multiple processing cores. The processor(s) 1528 can be implemented as one or more microprocessors, microcomputers, microcontrollers, digital signal processors, central processing units, state machines, logic circuitries, and/or any devices that manipulate signals based on operational instructions. For example, the processor(s) 1528 can be one or more hardware processors and/or logic circuits of any suitable type specifically programmed or configured to execute the algorithms and processes described herein. The processor(s) 1528 can be configured to fetch and execute computer-readable instructions stored in the computer-readable media 1530, which can program the processor(s) 1528 to perform the functions described herein.

The computer-readable media 1530 can include volatile and nonvolatile memory and/or removable and non-removable media implemented in any type of technology for storage of information, such as computer-readable instructions, data structures, program modules, or other data. Such computer-readable media 1530 can include, but is not limited to, RAM, ROM, EEPROM, flash memory or other memory technology, optical storage, solid state storage, magnetic tape, magnetic disk storage, RAID storage systems, storage arrays, network attached storage, storage area networks, cloud storage, or any other medium that can be used to store the desired information and that can be accessed by a computing device. Depending on the configuration of the server(s) 1504, the computer-readable media 1530 can be a type of computer-readable storage media and/or can be a tangible non-transitory media to the extent that when mentioned, non-transitory computer-readable media exclude media such as energy, carrier signals, electromagnetic waves, and signals per se.

The computer-readable media 1530 can be used to store any number of functional components that are executable by the processor(s) 1528. In many implementations, these functional components comprise instructions or programs that are executable by the processors 1528 and that, when executed, specifically configure the one or more processors 1528 to perform the actions attributed above to the service provider 1412 and/or payment processing service. Functional components stored in the computer-readable media 1530 can optionally include a merchant module 1536, a training module 1538, and one or more other modules and data 1540.

The merchant module 1536 can be configured to receive transaction data from POS systems, such as the POS system 1424 described above with reference to FIG. 14. The merchant module 1536 can transmit requests (e.g., authorization, capture, settlement, etc.) to payment service server computing device(s) to facilitate POS transactions between merchants and customers. The merchant module 1536 can communicate the successes or failures of the POS transactions to the POS systems. In some examples, the payment processing module 128 and the merchant module 1536 can perform the same or similar functions.

The training module 1538 can be configured to train models using machine-learning mechanisms. For example, a machine-learning mechanism can analyze training data to train a data model that generates an output, which can be a recommendation, a score, and/or another indication. Machine-learning mechanisms can include, but are not limited to supervised learning algorithms (e.g., artificial neural networks, Bayesian statistics, support vector machines, decision trees, classifiers, k-nearest neighbor, etc.), unsupervised learning algorithms (e.g., artificial neural networks, association rule learning, hierarchical clustering, cluster analysis, etc.), semi-supervised learning algorithms, deep learning algorithms, etc.), statistical models, etc. In at least one example, machine-trained data models can be stored in a datastore associated with the user device(s) 1502 and/or the server(s) 1504 for use at a time after the data models have been trained (e.g., at runtime).

The one or more other modules and data 1540 can include the fulfillment module 108, the authentication module 110, the API(s) 116, and/or the recommendation module 126, the functionality of which is described, at least partially, above. Further, the one or more other modules and data 1540 can include programs, drivers, etc., and the data used or generated by the functional components. Further, the server(s) 1504 can include many other logical, programmatic and physical components, of which those described above are merely examples that are related to the discussion herein.

The one or more "modules" referenced herein may be implemented as more modules or as fewer modules, and functions described for the modules may be redistributed depending on the details of the implementation. The term "module," as used herein, refers broadly to software stored on non-transitory storage medium (e.g., volatile or non-volatile memory for a computing device), hardware, or firmware (or any combination thereof) modules. Modules are typically functional such that they that may generate useful data or other output using specified input(s). A module may or may not be self-contained. An application program (also called an "application") may include one or more modules, or a module may include one or more application programs that can be accessed over a network or downloaded as software onto a device (e.g., executable code causing the device to perform an action). An application program (also called an "application") may include one or more modules, or a module may include one or more application programs. In some examples, a module may include one or more application programming interfaces (APIs) to perform some or all of its functionality (e.g., operations). In additional and/or alternative examples, the module(s) may be implemented as computer-readable instructions, various data structures, and so forth via at least one processing unit to configure the computing device(s) described herein to execute instructions and to perform operations as described herein.

The computer-readable media 1530 can additionally include an operating system 1542 for controlling and managing various functions of the server(s) 1504.

The communication interface(s) 1534 can include one or more interfaces and hardware components for enabling communication with various other devices, such as over the network(s) 1506 or directly. For example, communication interface(s) 1534 can enable communication through one or more network(s) 1506, which can include, but are not limited any type of network known in the art, such as a local area network or a wide area network, such as the Internet, and can include a wireless network, such as a cellular network, a local wireless network, such as Wi-Fi and/or close-range wireless communications, such as Bluetooth®, BLE, NFC, RFID, a wired network, or any other such network, or any combination thereof. Accordingly, network(s) 1502 can include both wired and/or wireless communication technologies, including Bluetooth®, BLE, Wi-Fi and cellular communication technologies, as well as wired or fiber optic technologies. Components used for such communications can depend at least in part upon the type of network, the environment selected, or both. Protocols for communicating over such networks are well known and will not be discussed herein in detail.

The server(s) 1504 can further be equipped with various I/O devices 1532. Such I/O devices 1532 can include a display, various user interface controls (e.g., buttons, joystick, keyboard, mouse, touch screen, biometric or sensory input devices, etc.), audio speakers, connection ports and so forth.

In at least one example, the system 1500 can include a datastore 1544 that can be configured to store data that is accessible, manageable, and updatable. In some examples, the datastore 1544 can be integrated with the user device 1502 and/or the server(s) 1504. In other examples, as shown in FIG. 15, the datastore 1544 can be located remotely from the server(s) 1504 and can be accessible to the server(s) 1504. The datastore 1544 can comprise multiple databases and/or servers connected locally and/or remotely via the network(s) 1506.

In at least one example, the datastore 1544 can store user profiles, which can include merchant profiles, customer profiles, and so on.

Merchant profiles can store, or otherwise be associated with, data associated with merchants. For instance, a merchant profile can store, or otherwise be associated with, information about a merchant (e.g., name of the merchant, geographic location of the merchant, operating hours of the merchant, employee information, etc.), a merchant category classification (MCC), item(s) offered for sale by the merchant, hardware (e.g., device type) used by the merchant, transaction data associated with the merchant (e.g., transactions conducted by the merchant, payment data associated with the transactions, items associated with the transactions, descriptions of items associated with the transactions, itemized and/or total spends of each of the transactions, parties to the transactions, dates, times, and/or locations associated with the transactions, etc.), loan information associated with the merchant (e.g., previous loans made to the merchant, previous defaults on said loans, etc.), risk information associated with the merchant (e.g., indications of risk, instances of fraud, chargebacks, etc.), appointments information (e.g., previous appointments, upcoming (scheduled) appointments, timing of appointments, lengths of appointments, etc.), payroll information (e.g., employees, payroll frequency, payroll amounts, etc.), employee information, reservations data (e.g., previous reservations, upcoming (scheduled) reservations, interactions associated with such reservations, etc.), inventory data, customer service data, etc. The merchant profile can securely store bank account information as provided by the merchant. Further, the merchant profile can store payment information associated with a payment instrument linked to a stored balance of the merchant, such as a stored balance maintained in a ledger by the service provider 1412.

Customer profiles can store customer data including, but not limited to, customer information (e.g., name, phone number, address, banking information, etc.), customer preferences (e.g., learned or customer-specified), purchase history data (e.g., identifying one or more items purchased (and respective item information), payment instruments used to purchase one or more items, returns associated with one or more orders, statuses of one or more orders (e.g., preparing, packaging, in transit, delivered, etc.), etc.), appointments data (e.g., previous appointments, upcoming (scheduled) appointments, timing of appointments, lengths of appointments, etc.), payroll data (e.g., employers, payroll frequency, payroll amounts, etc.), reservations data (e.g., previous reservations, upcoming (scheduled) reservations, reservation duration, interactions associated with such reservations, etc.), inventory data, customer service data, etc.

In at least one example, the account(s) 118, described above with reference to FIG. 1, can include or be associated with the merchant profiles and/or customer profiles described above.

Furthermore, in at least one example, the datastore 1544 can store inventory database(s) and/or catalog database(s). As described above, an inventory can store data associated with a quantity of each item that a merchant has available to the merchant. Furthermore, a catalog can store data associated with items that a merchant has available for acquisition. The datastore 1544 can store additional or alternative types of data as described herein.

The phrases "in some examples," "according to various examples," "in the examples shown," "in one example," "in other examples," "various examples," "some examples," and the like generally mean the particular feature, structure, or characteristic following the phrase is included in at least one example of the present invention, and may be included in more than one example of the present invention. In addition, such phrases do not necessarily refer to the same examples or to different examples.

If the specification states a component or feature "can," "may," "could," or "might" be included or have a characteristic, that particular component or feature is not required to be included or have the characteristic.

Further, the aforementioned description is directed to devices and applications that are related to payment technology. However, it will be understood, that the technology can be extended to any device and application. Moreover, techniques described herein can be configured to operate irrespective of the kind of payment object reader, POS terminal, web applications, mobile applications, POS topologies, payment cards, computer networks, and environments.

Various figures included herein are flowcharts showing example methods involving techniques as described herein. The methods illustrated are described with reference to FIGS. 1, 14, and 15 for convenience and ease of understanding. However, the methods illustrated are not limited to being performed using components described in FIGS. 1, 14, and 15, and such components are not limited to performing the methods illustrated herein.

Furthermore, the methods described above are illustrated as collections of blocks in logical flow graphs, which represent sequences of operations that can be implemented in hardware, software, or a combination thereof. In the context of software, the blocks represent computer-executable instructions stored on one or more computer-readable storage media that, when executed by processor(s), perform the recited operations. Generally, computer-executable instructions include routines, programs, objects, components, data structures, and the like that perform particular functions or implement particular abstract data types. The order in which the operations are described is not intended to be construed as a limitation, and any number of the described blocks can be combined in any order and/or in parallel to implement the processes. In some embodiments, one or more blocks of the process can be omitted entirely. Moreover, the methods can be combined in whole or in part with each other or with other methods.

What is claimed is:

1. A computer-implemented method comprising:
    generating, via a third party application, an interface of a fulfillment service provider using an application programming interface (API), wherein the interface enables a user to access fulfillment functionality from the fulfillment service provider using the third party application without leaving the third party application;
    receiving, via the interface associated with the fulfillment service provider, a request from the third-party application to access the fulfillment functionality from the fulfillment service provider, the third party application being associated with a third-party service provider;
    detecting that the fulfillment service provider has been initialized based, at least in part, on indication of an interaction between the user and the third-party application;
    determining context information associated with the interaction, the context information indicating a first event of the third-party service provider;
    determining event information pertaining to the first event, the event information including one or more of: a first date, a first time, a first location, or a route between two locations;
    predicting information pertaining to the first event based, at least in part, on the event information;
    generating, using the predicted information, a recommendation of a second event pertaining to at least one of: a service available via the fulfillment service provider, a merchant available via the fulfillment service provider, or an item available via the fulfillment service provider; and causing the recommendation to be presented via the third-party application through the generated interface.

2. The computer-implemented method of claim 1, wherein:

the interface is accessible to a plurality of third-party applications including the third-party application;

the request is an authentication request; and the computer-implemented method further comprises associating the fulfillment service provider with the third-party application based at least in part on authenticating the third-party application.

3. The computer-implemented method of claim 1, further comprising:

determining an identity of the user associated with the interaction;

accessing user information based at least in part on the identity of the user; and generating the recommendation based at least in part on the user information.

4. The computer-implemented method of claim 1, further comprising causing the recommendation to be presented via a graphical user interface (GUI) presented via the third-party application, the GUI including at least one interactive component to allow the user to interact with the fulfillment service provider.

5. A system comprising:

one or more processors;

computer-readable media storing instructions, that when executed, cause the one or more processors to perform operations comprising:

generating, via a third party application, an interface of a fulfillment service provider using an application programming interface (API), wherein the interface enables a user to access fulfillment functionality from the fulfillment service provider using the third party application without leaving the third party application;

processing a request to access the fulfillment functionality from the fulfillment service provider, the request being received via the interface associated with the fulfillment service provider from the third-party application, the third party application being associated with a third-party service provider;

detecting that the fulfillment service provider has been initialized based, at least in part, on an indication of an interaction between a user and the third-party application;

determining context information associated with the interaction, the context information indicating a first event of the third-party service provider;

determining event information pertaining to the first event, the event information including one or more of: a first date, a first time, a first location, or a route between two locations;

predicting information pertaining to the first event based, at least in part, on the event information;

generating, using the predicted information, a recommendation of a second event pertaining to at least one of: a service available via the fulfillment service provider, a merchant available via the fulfillment service provider, or an item available via the fulfillment service provider; and causing the recommendation to be presented via at least one of the third-party application or the fulfillment service provider through the generated interface.

6. The system of claim 5, the operations further comprising:

receiving an authentication request from the third-party application; and associating the fulfillment service provider with the third-party application based at least in part on authenticating the third-party application.

7. The system of claim 5, the operations further comprising:

determining an identity of at least one of the user or a service provider associated with the third-party application;

accessing user information based at least in part on the identity; and generating the recommendation based at least in part on the user information.

8. The system of claim 5, wherein the event information includes at least one of: a location of the first event, a time of the first event or a real-time count of invitees attending the first event.

9. The system of claim 5, wherein the event information includes a location of the first event, and the operations further comprise determining a set of merchants based at least in part on the location of the first event, wherein the set of merchants are within a threshold distance of the location of the first event.

10. The system of claim 5, wherein the context information comprises at least one of:

a date;

a time;

a location;

an event detail associated with the first event;

one or more items added to a ticket or a virtual cart;

subject matter of a conversation between the user and another user via the third-party application;

subject matter of a content item presented via the third-party application;

subject matter of a social media post presented via the third-party application;

a pick-up location;

a drop-off location; or a route between two locations.

11. The system of claim 5, the operations further comprising determining the context information based at least in part on a machine-trained model.

12. The system of claim 5, the operations further comprising causing the recommendation to be presented via a graphical user interface (GUI), the GUI including at least one interactive component to allow the user to interact with the fulfillment service provider.

13. A non-transitory computer-readable storage medium comprising computer program instructions configurable such that, when executed by one or more processors, the computer program instructions cause the one or more processors to:

generating, via a third party application, an interface of a fulfillment service provider using an application programming interface (API), wherein the interface enables a user to access fulfillment functionality from the fulfillment service provider using the third party application without leaving the third party application;

processing a request to access the fulfillment functionality from the fulfillment service provider, the request being received via the interface associated with the fulfillment service provider from the third-party application, the third party application being associated with a third-party service provider;

detecting that the fulfillment service provider has been initialized based, at least in part, on an indication of an interaction between the user and the third-party application;

determining context information associated with the interaction, the context information indicating a first event of the third-party service provider;

determining event information pertaining to the first event, the event information including one or more of: a first date, a first time, a first location, or a route between two locations;

predicting information pertaining to the first event based, at least in part, on the event information;

generating, using the predicted information, a recommendation of a second event pertaining to at least one of: a service available via the fulfillment service provider, a merchant available via the fulfillment service provider, or an item available via the fulfillment service provider; and causing the recommendation to be presented via at least one of the third-party application or the fulfillment service provider through the generated interface.

14. The non-transitory computer-readable storage medium of claim 13, wherein the fulfillment service provider is initialized responsive to receiving the request or detection of a trigger word associated with the interaction.

15. The non-transitory computer-readable storage medium of claim 13, wherein the interaction is associated with the first event, wherein the recommendation identifies a set of merchants, the computer program instructions further configurable to cause:

causing the recommendation to be presented via a graphical user interface (GUI), the GUI including at least one interactive component to allow the user to interact with the fulfillment service provider via the interface.

16. The non-transitory computer-readable storage medium of claim 15, wherein:

the event information includes a real-time count of invitees attending the first event.

17. The non-transitory computer-readable storage medium of claim 13, the computer program instructions further configurable to cause:

determining the context information, based at least in part on a machine-trained model.

18. The non-transitory computer-readable storage medium of claim 13, wherein the context information comprises at least one of:

a date;
a time;
a location;
an event detail associated with the first event;
one or more items added to a ticket or a virtual cart;
subject matter of a conversation between the user and another user via the third-party application;
subject matter of a content item presented via the third-party application;
subject matter of a social media post presented via the third-party application;
a pick-up location;
a drop-off location; or
a route between two locations.

19. The computer-implemented method of claim 1, wherein determining the event information comprises obtaining at least a portion of the event information from the third-party application, in real-time, during the first event.

20. The computer-implemented method of claim 1, the recommendation providing a recommended second time at which the second event is to be initiated.

21. The computer-implemented method of claim 1, the first event being a transportation event and the second event being a food order event.

* * * * *